United States Patent
Hall

(10) Patent No.: US 9,740,599 B2
(45) Date of Patent: Aug. 22, 2017

(54) DIRECTED RANDOM SEQUENCE GENERATION METHOD AND APPARATUS FOR TESTING SOFTWARE

(71) Applicant: Randomize Limited, Milton Keynes (GB)

(72) Inventor: Giles Thomas Hall, Evesham (GB)

(73) Assignee: RANDOMIZE LIMITED, Milton Keynes (GB)

( * ) Notice: Subject to any disclaimer, the term of this patent is extended or adjusted under 35 U.S.C. 154(b) by 113 days.

(21) Appl. No.: 14/777,916

(22) PCT Filed: Mar. 28, 2014

(86) PCT No.: PCT/GB2014/000128
§ 371 (c)(1),
(2) Date: Sep. 17, 2015

(87) PCT Pub. No.: WO2014/155050
PCT Pub. Date: Oct. 2, 2014

(65) Prior Publication Data
US 2016/0210226 A1     Jul. 21, 2016

(30) Foreign Application Priority Data
Mar. 28, 2013   (GB) .................................. 1305851.6

(51) Int. Cl.
| | | |
|---|---|---|
| *G06F 11/00* | (2006.01) | |
| *G06F 11/36* | (2006.01) | |
| *G06F 7/58* | (2006.01) | |

(52) U.S. Cl.
CPC .......... *G06F 11/3688* (2013.01); *G06F 7/584* (2013.01); *G06F 11/3672* (2013.01);
(Continued)

(58) Field of Classification Search
CPC .. G06F 7/584; G06F 11/3672; G06F 11/3676; G06F 11/3684; G06F 11/3688; G06F 11/3692
(Continued)

(56) References Cited

U.S. PATENT DOCUMENTS

| | | | |
|---|---|---|---|
| 5,394,405 A | 2/1995 | Savir | |
| 6,557,120 B1 * | 4/2003 | Nicholson | G06F 11/008 714/31 |

(Continued)

FOREIGN PATENT DOCUMENTS

| | | |
|---|---|---|
| WO | WO9611438 | 4/1996 |
| WO | WO0072146 | 11/2000 |

OTHER PUBLICATIONS

Wanchun et al., "Using Random Test Selection to Gain Confidence in Modified Software", Software Maintenance, 10 pages.
(Continued)

*Primary Examiner* — Elmira Mehrmanesh
(74) *Attorney, Agent, or Firm* — Michael J. Feigin, Esq.; Feigin & Fridman

(57) ABSTRACT

A verification apparatus and method are disclosed for testing a device or system which is operable in a number of states through which it can transition in a multiplicity of different sequences. The method and apparatus disclosed include a set of functional modules which correspond to the states of the device or system under test and which may be activated in a large number of pseudorandom sequences. Each time a module of the verification apparatus is activated it causes the device or system under test to transition to the corresponding state. Thus, when the functional modules of the verification apparatus are activated in a given sequence, the corresponding states of the device or system under test are called in the same sequence.

20 Claims, 14 Drawing Sheets

(52) U.S. Cl.
CPC ...... *G06F 11/3676* (2013.01); *G06F 11/3684* (2013.01); *G06F 11/3692* (2013.01)

(58) Field of Classification Search
USPC ........................................................ 714/38.1
See application file for complete search history.

(56) References Cited

U.S. PATENT DOCUMENTS

| | | | | |
|---|---|---|---|---|
| 6,567,924 B1 * | 5/2003 | McGee | ............... | G06F 11/3688 |
| | | | | 702/108 |
| 6,728,654 B2 * | 4/2004 | Boehm | ............... | G06F 11/263 |
| | | | | 702/119 |
| 6,807,646 B1 * | 10/2004 | Williams | ......... | G01R 31/31832 |
| | | | | 714/724 |
| 7,240,268 B2 * | 7/2007 | Wrigley | ............... | H04L 43/50 |
| | | | | 714/739 |
| 7,363,567 B2 * | 4/2008 | Rands | ............... | G06F 11/263 |
| | | | | 714/735 |
| 8,286,042 B2 * | 10/2012 | Gangasani | ....... | G01R 31/31838 |
| | | | | 714/30 |
| 8,707,102 B2 * | 4/2014 | Takao | ............... | G06F 11/28 |
| | | | | 714/25 |
| 9,015,667 B2 * | 4/2015 | Meijer | ............... | G06F 11/076 |
| | | | | 717/124 |
| 2005/0129247 A1 * | 6/2005 | Gammel | ............... | G06F 7/582 |
| | | | | 380/286 |
| 2006/0058976 A1 * | 3/2006 | Ferris | ............... | G06F 9/45537 |
| | | | | 702/123 |
| 2008/0028364 A1 | 1/2008 | Triou et al. | | |
| 2009/0222696 A1 * | 9/2009 | Duale | ............... | G06F 11/263 |
| | | | | 714/32 |

OTHER PUBLICATIONS

Kalaiselvi et al., "LFSR-Reseeding Scheme for Achieving Test Coverage", International Journal of Computer Trends and Technology (IJCTT) vol. 4, Issue 5, May 2013, pp. 1070-1074.

* cited by examiner

DIRECTED RANDOM SEQUENCE GENERATION METHOD AND APPARATUS FOR TESTING SOFTWARE

CROSS-REFERENCE TO RELATED APPLICATIONS

This application is a national stage entry under 35 U.S.C. §371 of International Application No. PCT/GB2014/000128, filed Mar. 28, 2014, published in English, which claims the benefit of priority of Great Britain Patent Application No. 1305851.6, filed Mar. 28, 2013, all of which are hereby incorporated by reference herein in their entirety.

FIELD OF THE INVENTION

This invention relates to methods and apparatus for the testing of electronic systems and devices, especially computer controlled digital systems and devices. The invention is particularly applicable to the testing of such systems and devices prior to and during the manufacture thereof so that erroneous operability or functionality can be detected and corrected, thereby enabling the quality and reliability of the manufactured product to be improved.

BACKGROUND

Electronics systems which may include both hardware and software components, must be tested or functionally verified in order to ensure, as far as practicable, that they operate correctly under all conceivable circumstances.

Differences between the intended or required functionality of the system and the actual functionality are commonly referred to as "bugs" and may fall into three general categories:

(1) Syntax coding errors, i.e. where the coding employed to implement the algorithms has been used incorrectly. These problems should rarely propagate to the final product.
(2) Syntax or semantic misuse, for example where the coding has been used in a legal way (i.e. it is syntactically correct) but one or more possible implications of the way in which the syntax has been used has not been fully considered. This may cause a malfunction either immediately or after a period of time.
(3) Incorrect functional implementation or misunderstanding. This covers cases where the required functionality has not been implemented fully or correctly. This may be due to complexity, misunderstandings, simple mistakes or other causes. Often these sorts of bugs are not at all obvious and only cause problems under unusual or unforeseen combinations of circumstances.

As such electronic systems become increasingly complex, the time and effort that needs to be expended in order to functionally test the equipment increases significantly, and can take a substantial part of the development effort and often the majority of the development effort. A significant problem is to cover every possible condition or scenario that the design may encounter during operation. For example, if the operation of the software can be illustrated in the form of a state transition diagram or state diagram where the system transitions from one state to another, the number of states in the entire state space that defines all possible states in which the system may find itself may be so large that only a small number of states may be covered by manually testing the program, and large areas of the state space must necessarily remain uncovered in any manual testing regime with the result that errors and bugs may remain undetected.

SUMMARY OF INVENTION

The present invention provides a method and apparatus that may alleviate or overcome this problem and enables systems to be verified by means of a system verification apparatus.

The invention may enable a system to be verified by a process in which the states of the system or sequences in the running of the software may be generated automatically, and the operation of the system as it transitions from one state to another in a random or pseudo-random manner may be observed and the functioning of the system may be logged automatically, with the result that the way the system functions in different states may be speeded up considerably, and the proportion of the state space of the system under test may be significantly increased.

In an embodiment, the invention provides a verification method and apparatus in which software modules of the device under test are called into operation in one or more deterministic pseudorandom sequences, to enable the operation of the modules to be monitored.

In another embodiment, the invention provides verification method and apparatus in which simulated software modules of the device whose functionality is to be tested are called into operation in one or more deterministic pseudo-random sequences, to enable operation of the simulated modules to be monitored.

In a further aspect, the invention provides a verification method and apparatus in which the functional modules of the device under test, or simulations of those functional modules, are called into operation in a multiplicity of different sequences in a manner such that said sequences are repeatable.

In a further aspect, the invention provides a verification method and apparatus in which a plurality of functional modules, each corresponding to a respective different functional state of the device or system to be tested, are called into operation in a particular sequence, for example a deterministic pseudorandom sequence, and, upon being called into operation, cause the corresponding functional modules of the device or system under test to be called into operation.

BRIEF DESCRIPTION OF THE DRAWINGS

The invention will now be described by way of example with reference to the accompanying drawings in which.

MANUFACTURING AND TESTING PROCESSES

Manufacturing Process

Figure 1:
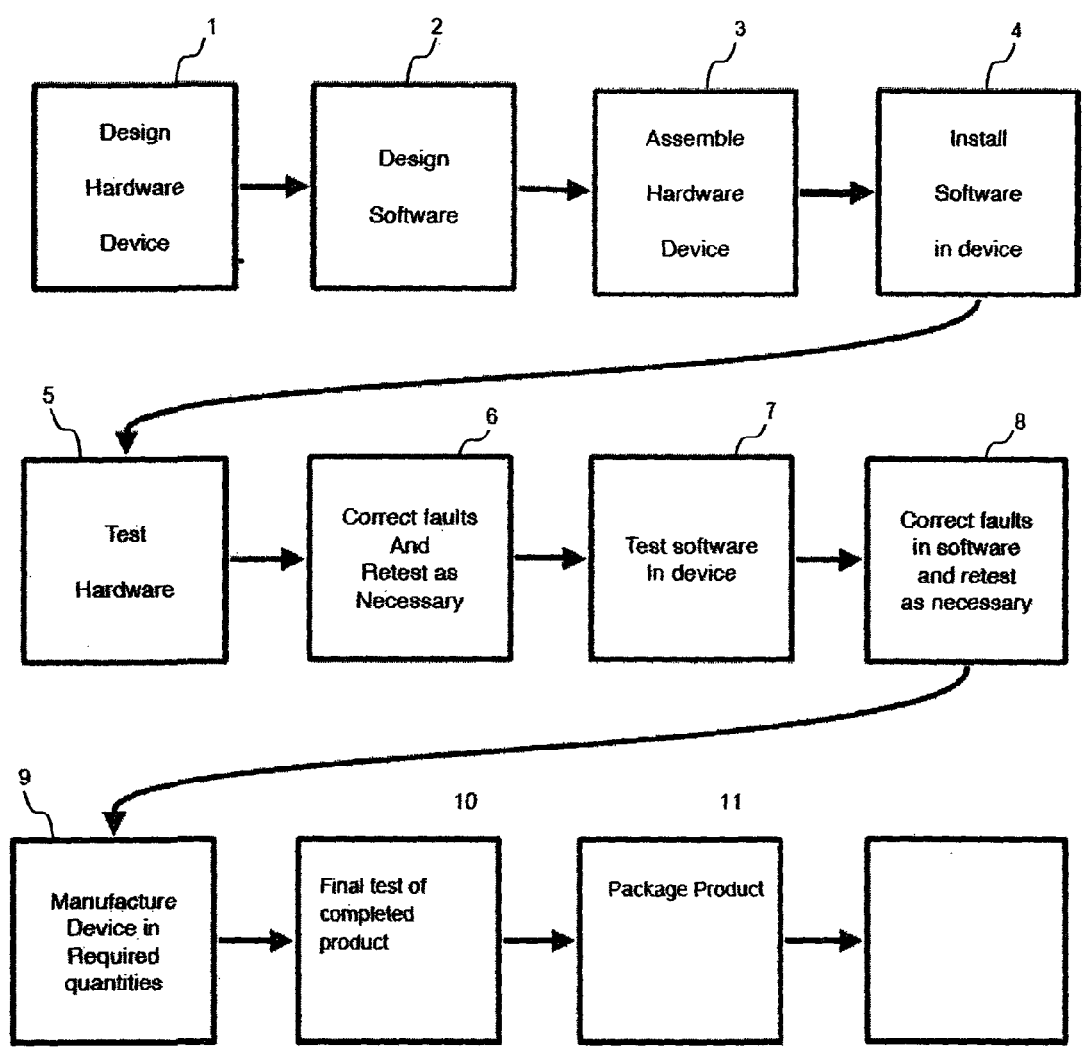
FIG. 1 is a schematic flow diagram of a design testing and manufacturing process for the production of an article to which the present invention is applicable.

FIG. 1 is a schematic representation of a general design and manufacturing method to which the method and apparatus according to the present invention are applicable. This figure shows a number of steps in the manufacture, testing and production of a complex item comprising a hardware device with so-called embedded software.

In step 1 the hardware device is designed, and in step 2 the software for enabling the hardware to function is designed. In step 3 hardware devices according to the design of step 1 are assembled, and in Step 4 the software of Step 3 is installed in the hardware devices so made. In step 5 the hardware is tested for its mechanical and electrical functioning and any faults are tested and corrected accordingly in step 6. The software in the device may be tested and verified in step 7, and any faults in the software may be corrected and retested as necessary in step 8.

Once both the hardware and software have been tested the device may be manufactured at step 9 and any final testing be conducted. After packaging the device is ready for sale.

Current Testing Methods

Figure 2:
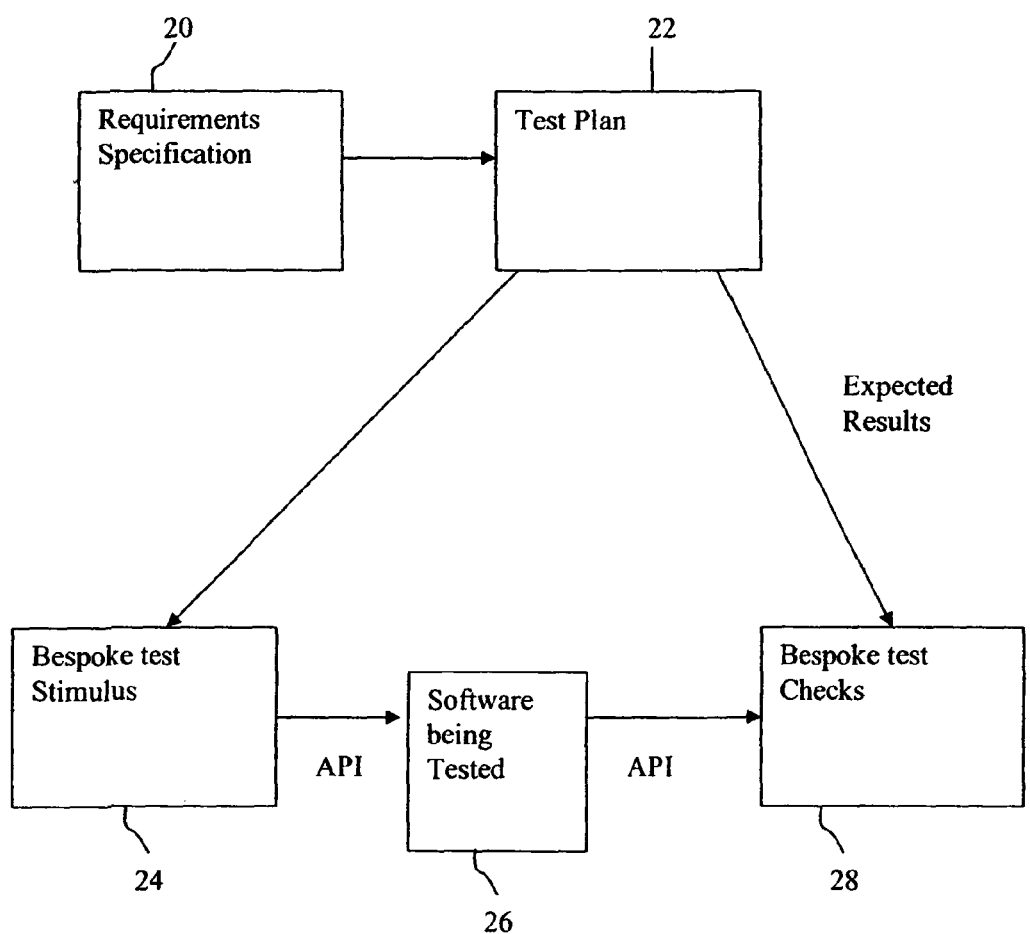
FIG. 2 is a schematic block diagram of one method of verifying software according to the prior art.

The current best practice for performing the software testing of step 7 to find functional bugs is based on a process of writing tests for specific "use cases" as shown in FIG. 2.

Each use case is first defined by the verification team, and is normally defined in a natural language. The use case is a description of the flow of use of the software under test, along with expected responses. Use cases are generally derived from the requirements specification 20, along with the verification engineer's expertise, which indicate use cases that are known to be likely to highlight problems, and those cases which stress implementation parameters or explore uncommon extremes of the state space. Such uncommon extremes may for example include circumstances in which a large number of inputs occur simultaneously with resultant data overflows that may cause error conditions.

The combined use cases are documented in a test plan 22, along with expected results for each use case. Test cases are then developed that exercise the design according to each use case by applying bespoke stimuli 24 to the software 26 and checking 28 that the software behaves as defined by the expected results. This form of testing has the following disadvantages:

(a) The quality of verification depends on the verification team identifying use cases. This is a manual process, and as such is prone to errors and omissions. Many bugs that make it through to the final products end up being left undiscovered because the verification team did not expect a particular use case.

(b) The total state space for a given software item is potentially vast, and any verification strategy based on identifying scenarios and manually building up a test is bound to cover only a small proportion of the complete state space.

(c) The quality of each test depends on engineering effort, and if a test engineer fails to develop the stimulus or checks correctly, the effectiveness of the test would be compromised.

(d) The effectiveness of bespoke tests can degrade over the lifecycle of a project as new versions of the product software are developed.

(e) Reusing previous work can mean that different start-up routines may be missed, so that the need to write tests quickly can be in conflict with the need for maximum test variation.

The invention, at least in preferred embodiments, may overcome or alleviate at least some of these disadvantages.

Overview of First Embodiment of the Invention

Figure 3:
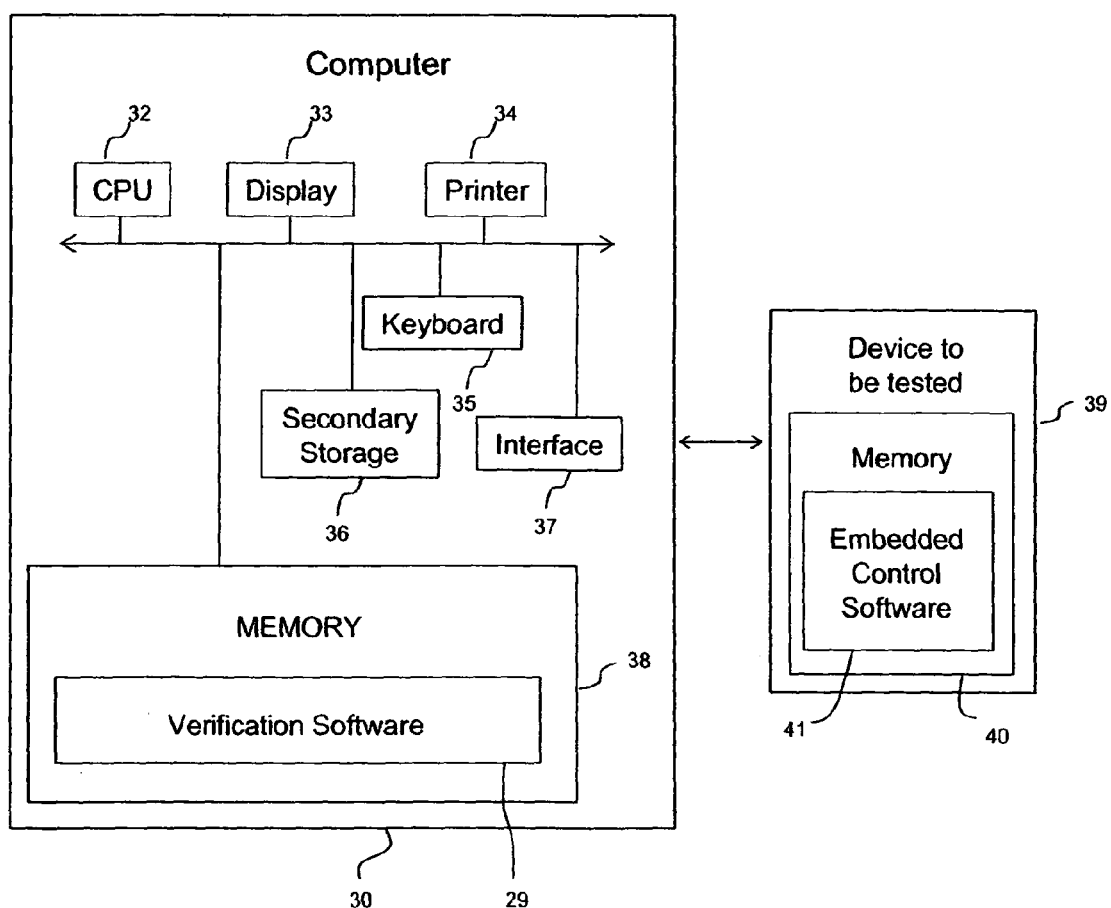
FIG. 3 is a block diagram of apparatus according to an embodiment of the invention for verifying the embedded software employed in a device under test, such as a cell phone.

FIG. 3 is a block diagram showing a verification apparatus 30 according to an embodiment of the present invention connected to an external device 39 having embedded software to be tested and verified by the apparatus 30.

The apparatus 30 is connected to the device 39, for example by means of a universal serial bus (USB) or by any other appropriate means such as a wireless connection or via a wireless or hardwired communications network.

Verification Apparatus

The verification apparatus 30 comprises a conventional programmable digital computer that includes a central processing unit 32, a display 33, printer 34, keyboard 35, secondary storage 36 for example a hard drive, and an input/output interface 37 for transmission of data to, and receipt of data from, external devices including device 39. The computer 30 also includes memory 38 for storing data and programs. The memory 38 stores verification software 29 for testing and verifying the embedded software of the external device 39.

The verification software 29 may be loaded into the computer from a carrier carrying computer executable instructions which, when run on the computer 30, cause it to carry out a verification process or processes in accordance with the invention. The carrier may take any of a variety of forms including an electrical or electromagnetic signal, such as a radio wave or optical signal, or a storage device such as a magnetic, solid-state or optical storage device. The invention extends to such a carrier carrying such computer executable instructions.

External Device to be Tested

The external device 39 has a memory 40 that contains control software 41 that is to be tested and verified according to the invention.

As will be more fully described below, the control software 41 comprises a number of functional modules (not shown in FIG. 3) which, during use of the device, are called into operation in a number of different sequences. In practice, there may be a large number of such modules and a large number of different sequences in which they can be called into operation dependent upon the way in which the device is used.

The device 39 may thus be considered to be a state machine where the calling into operation of each different module puts the device into a different state. Thus, in practice the device may transition through the states in a large number of different sequences dependent upon the way in which the device is being used at any given time.

Outline of Functionality of Verification Apparatus

The verification apparatus 30 operates by causing the device 39 to transition through its states in a large number of different sequences in order to test whether or not the functional modules of the device 39 operate correctly when those functional modules are "called" during the different sequences.

As will become apparent from the following description, the verification software 29 includes a set of modules (not shown in FIG. 3), which will be referred to as "state modules", which correspond to the functional modules of the device 39 and which may be activated in a large number of different sequences. Each time a state module of the verification software is activated it causes the corresponding functional module of the device 39 to be called. Thus, when the verification software 29 activates its state modules in a given sequence, the corresponding functional modules of the device 39 are called in the same sequence.

The verification software 29 also includes, as will be described in more detail below, modules for checking for errors in the operation of the external device, for logging such errors and for recording specific states and specific sequences of states of the external device which have been tested by the verification apparatus.

First Detailed Example

To facilitate understanding the structure and operation of the verification software 29, it will be described initially by way of a detailed example, in which the external device 39 shown in FIG. 3 is taken to be a cell phone. However, it should be understood that the invention has wide application and can be used for verifying many different kinds of software controlled systems, devices and apparatus.

Figure 4:
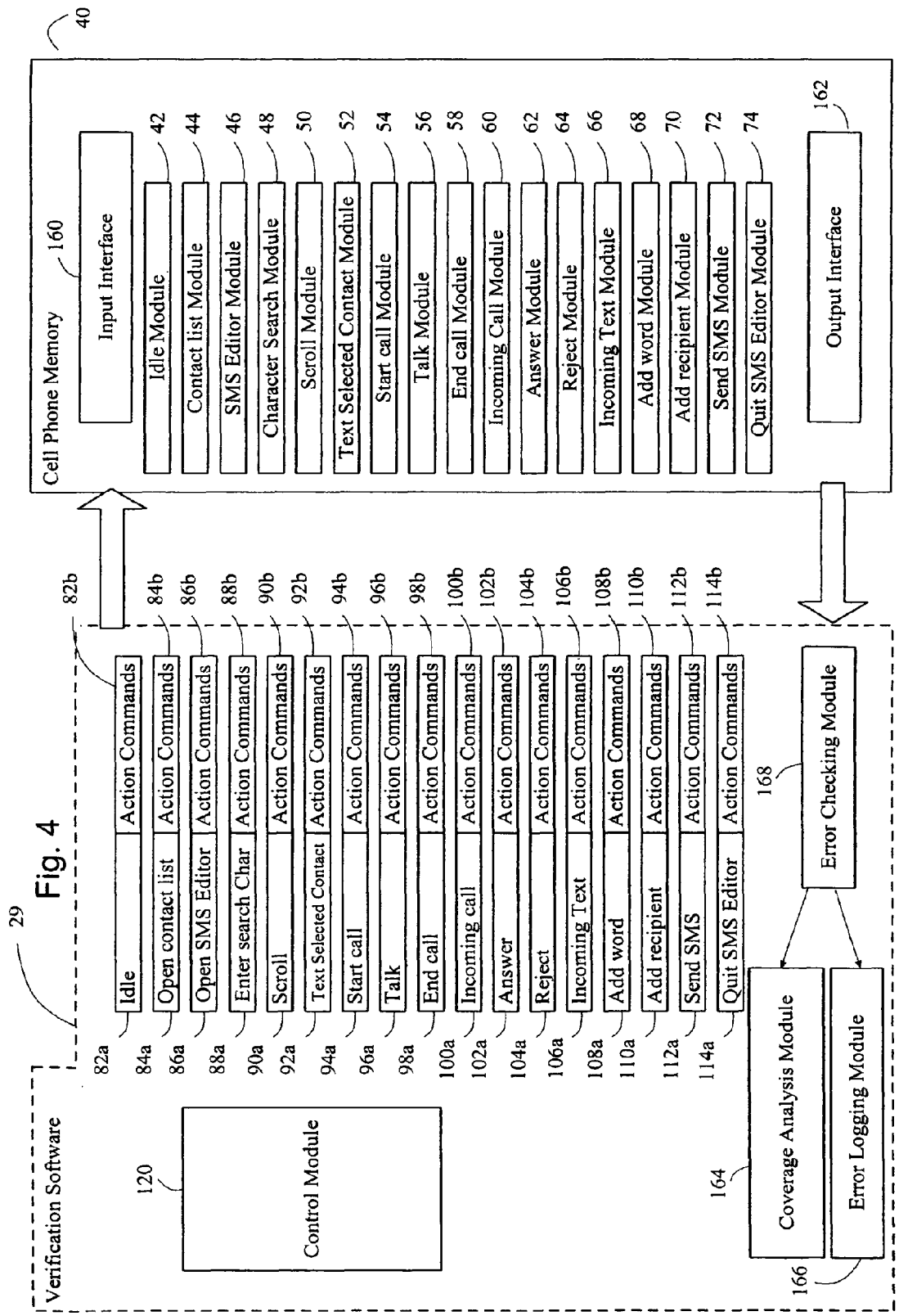
FIG. 4 is a functional block diagram of the cell phone and verification software of FIG. 3 in greater detail.

FIG. 4 is a schematic representation of the main components both of the verification software 29 and of the embedded software stored in the memory 40 of the cell phone 39 to be tested and verified. The modules of the verification software 29 are shown in the left-hand portion of the drawing and the modules of the cell phone are shown in the right-hand portion of the drawing. FIG. 4 is drawn in a manner which facilitates understanding the relationship between the modules of the verification software 29 and the functional modules of the cell phone 39.

The cell phone 39, and its functional modules, will be described first so that these can be understood before the verification software 29 is described. This will enable the verification software 29 to be described, and understood, in the context of the example of its use for verifying the software of the cell phone 39.

Cell Phone
Cell Phone Functional Modules

As shown in FIG. 4, cell phone memory 40 includes a number (seventeen in this example) of functional modules 42 to 74 in software each of which may be called by means of a respective application program interface (API), not shown in the drawings, when the telephone is operated.

Thus, the telephone includes an idle module 42 which controls the mobile phone when switched on but not actively in operation. The idle module may poll a number of other modules, for example the contact list module 44, the SMS editor 46, the incoming call module 50 and the incoming text module 56 in order to ascertain whether any incoming calls or text messages are received or whether the operator has pressed the keypad in order to generate any messages.

The contact list module 44 enables contacts that have previously been entered to be displayed and enables new contacts to be included in the contact list in memory or old contacts to be deleted. The character search module 48 receives characters from the keypad interface and displays that character on the display. The scroll module 50 enables the display to be scrolled up or down by appropriate actuation of the navigation key in order to display the desired information, e.g. contacts, that are stored in alphabetical order. The text selected module 52 is operable to receive confirmation of selection from the keypad interface and to move to any further module that can operate on the text.

The start call module 54 is operable to cause the phone to log on to the local base station, in order to call the selected number. The start call module may also switch on the loudspeaker (earpiece) in order to enable the operator to hear a ringing tone. The talk module 56 is operable to maintain the phone microphone the loudspeaker (earpiece) in their on states in order to enable the operator to conduct a conversation with the person called. The end call module 58 is operable to receive input from the keypad interface in order to disconnect the microphone and earpiece, to send the required packet to the base station in order to terminate the call, and to handle billing of the call.

The incoming call module 60 is operable to switch on the loudspeaker or vibrator and to actuate any chosen ring tone in order to alert the user of an incoming call. The answer module 62 is operable to connect the phone to the base station, to switch on the loudspeaker and microphone. The reject module 64 is operable to terminate the telephone call.

The incoming text module 56 is operable to activate the microphone in order to sound a text message ring tone and to display the text message on the screen.

The SMS editor 46 is operable to control the sending or receiving of short message service (SMS) messages to desired recipients and from senders. The editor may be operable to display a list of recipients and to edit it, and to display an SMS message. The Add Word module 66 is operable to build up a word, character by character to create an SMS message. The Add Recipient module 68 is operable to load an intended recipient of an SMS message to an SMS message buffer and do display the recipient on the screen. The Send SMS module 70 is operable to cause the mobile phone to connect to the local base station, to send a packet or number of packets containing the SMS message to the base station for forward transmission to the recipient, to handle billing of the call and to indicate that the message has been sent on the screen. Finally, the Quit SMS editor module 72 is operable to cause the mobile phone to close down the SMS connection with the base station.

State Diagram of Cell Phone

Figure 5:
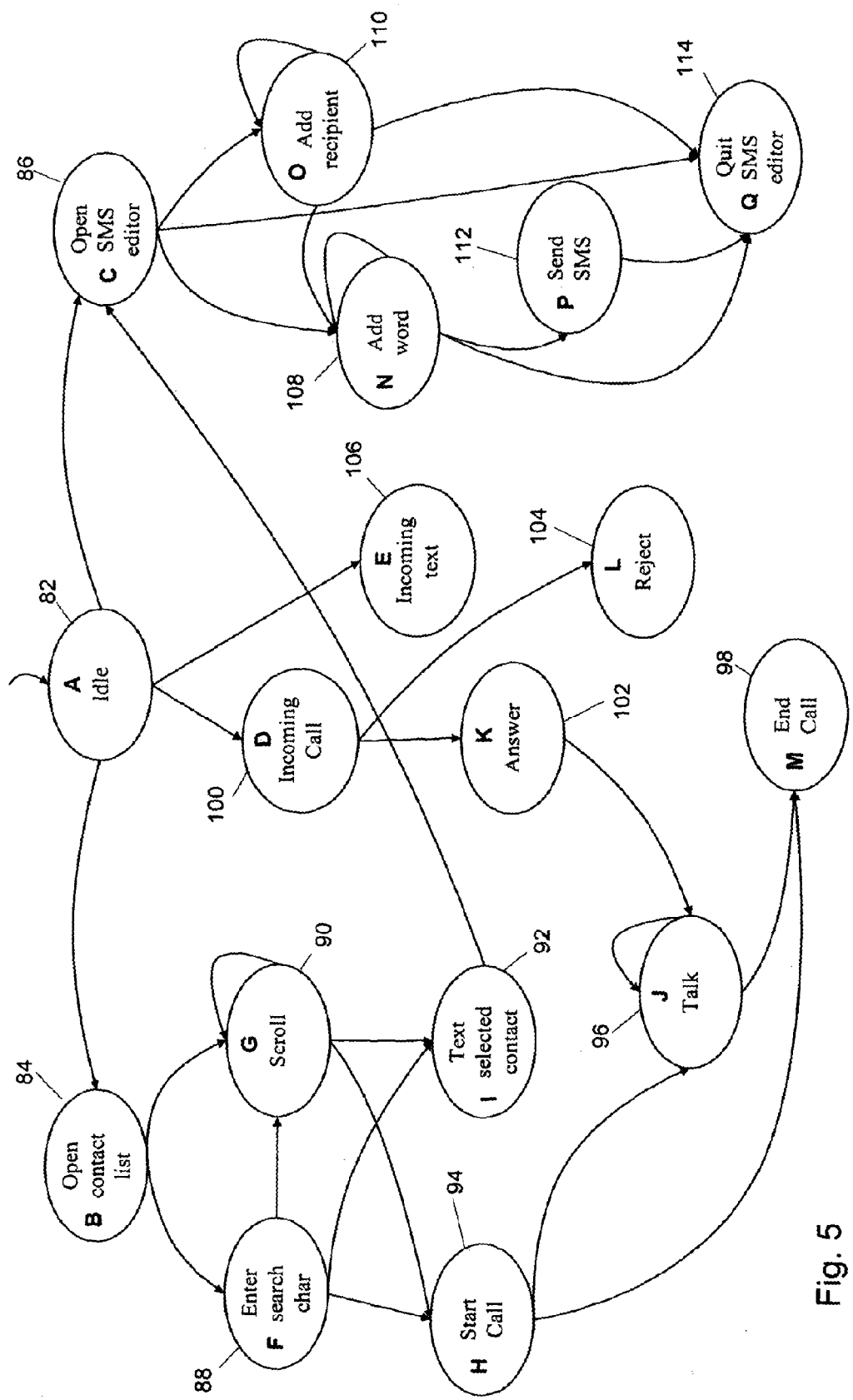
FIG. 5 is a state diagram showing the states to which the cell phone shown in FIG. 4 may transition.

FIG. 5 is a state transition diagram showing a state space for the mobile phone functions of this example. Thus, there are seventeen states 82 to 114, which correspond respectively to the functional modules 42 to 74. Each of the states 82 to 114 is labelled in FIG. 5 with the name of the functional module 42 to 74 to which it corresponds.

Also, each state 82 to 114 is labelled with a respective capital letter A to Q. This is to facilitate description of the way in which the verification software may determine whether specific sequences of transitions through the states have been tested. Description of this will be given later with reference to FIGS. 11 and 12.

As shown in FIG. 5, the state diagram starts with the "idle" state 82 in which the phone will be in for most of the time, i.e. unless any of the states in which the phone is to operate is called. The telephone will revert to the idle state whenever any of the operations of the phone is terminated.

From the idle state, the phone is able to transition to any of four subsequent states, referred to as "next states", namely the "open contact list" state 84, the "incoming call" state 100, the "incoming text" state 106 and the "open SMS editor" state 86. While the phone is in the idle state, it will poll each of the next states in turn in order to determine whether any of the next states has been called, either by the operator or by a remote telephone.

One of the next states shown in the state diagram is the "open contact list" state 84. The phone enters the "open contact list" state when it receives a signal from the keypad interface indicating that the appropriate key has been pressed. This state may cause the screen to display the contact list or part of the contact list, or it may display a single contact. Alternatively it may display a blank page for a contact to be inserted.

From the "open contact list" state, the phone may transition to the "Enter search Character" state 88 or the "Scroll" state 90. In the "enter search character" state the screen may record a search character in memory or a buffer and display the character while waiting for the next character. The phone may remain in this state until an entire contact name or other identification of the contact has been entered. This state has three next states, namely the "scroll" state 90, the "Text Selected Contact" state 92 and the "Start Call" state 94. In the "scroll" state, the phone displays part of the contact list and awaits input from one of the keys, for example the navigation key, to cause the displayed contact list to scroll upwards toward the beginning of the alphabet or downwards towards the end of the alphabet. The "Scroll" state has three next states, namely itself, the "Start Call" state and the "Text Selected Contact" state.

The "Start Call" state can be entered from the "Enter Search Character" state or the "Scroll" state and is employed once the intended recipient has been selected, to commence a telephone call. This state causes the phone to pass the intended recipient identification to the base station so that the mobile network can make the necessary connection, to identify that a call is in progress on the screen, to turn on the loudspeaker and to play a ringing tone to confirm that the remote phone is ringing. The "Start Call" state may also commence any billing procedures with the base station."

The "Text Selected Contact" state may be entered from either the "Enter Search Character" state or the "Scroll" state once the desired contact has been identified, and can call the "Open SMS" editor state.

The "Incoming Call" state is entered when the phone receives a call from a remote mobile. This state may cause the phone to switch on the loudspeaker and play any ring tone. The Incoming call state has two next states, namely the "Answer" state 102 and the "Reject" state 104. The Answer state may be actuated by depressing an appropriate key on the keypad and will switch on the microphone and loudspeaker (earpiece) in order to enable the operator to hold a conversation with the operator of the remote phone. Once actuated, the Answer state transitions to the Talk state 96.

Alternatively, by pressing a different key, the phone may transition to a "Reject" state 104. This state may be entered if the operator does nothing and the call is terminated. From the Reject state, the phone may re-enter the Idle state.

The phone may enter the "Talk" state from either the Start Call state if the operator is initiating the call, or from the Answer state if the call is initiated by the remote device. The Talk state 96 has itself as a next state so that once any data packet with audio data has been sent to the base station or received by the device from the base station the device will transition to itself so that the call may continue for as long as the user of the phone and the user of the remote phone wish. The Talk state may alter the message displayed on the screen and control billing of the call if necessary depending on who initiated the call. An "End Call" state 98 may be entered by the phone from either the Talk state or from the Start Call state by pressing an appropriate key on the keypad. The End Call state may turn off the microphone and loudspeaker and cause the screen display to revert to the default display. The End Call state will also cause the phone to terminate the call at the base station, and to revert to the Idle state.

In addition to the Incoming Call state, the Idle state has an "Incoming Text" state 106 to which the phone transitions when a text message such as an SMS message is received. This state may cause the device loudspeaker to sound a tone to indicate receipt of a text message, and to display an indication that a message has been received so that the message can be read by pressing an appropriate key.

The device may also have an "Open SMS Editor" state 86 that can be entered from either the Idle state or from the "Text Selected Contact" state. This state may cause the SMS editor to open in order to be able to transition to one of three next states, namely the "Add Word" state 108, the "Add Recipient" state 110 and the "Quit SMS Editor" state 114. The Add Word state enables the device to receive alphanumeric characters from the keypad in order to generate a short text message and to store it in RAM or a buffer. The Add Word state has three next states, namely itself, the "Send SMS" state 112 and "Quit SMS Editor" state 114. The ability of the Add Word state to transition to itself enables the operator to add characters or words of any length allowed by the memory or buffer. The "Send SMS" state will cause the display on the device to alter to change in order to display appropriate information such as the recipient of the message and/or an indication of successful or unsuccessful transmission of the message.

In addition to the Add Word state, the Open SMS Editor state may transition to the "Add Recipient" state 110 which may open the recipient contact list memory. The Add Recipient state may transition to itself as a next state so that recipients of different length names may be added by appropriate key depressions. The Add Recipient state may instead transition to either the Add Word state or to the "Quit SMS Editor" state. Transitioning to the Add Word state enables the SMS message to be input from the keypad after the recipient name has been input.

The Add Word state, the Send SMS state and the Add Recipient state may all transition to the "Quit SMS Editor" state 114, allowing the operator to exit the SMS editor once a recipient has been included in the directory, once an SMS message has been sent or during creation of an SMS message without sending it.

As an example of operation of the phone in which the user makes a call to a remote telephone, the device will start in the Idle state. If the user wishes to make a call to a third party he may press one of the keys which may give him the option of opening the contact list or opening the SMS editor. If he wishes to make a phone call, he will depress the key in order to cause the device to transition to the "Open Contact List" state whereupon the contact list or part of the contact list will be retrieved from memory and displayed on the screen. The function of the navigation key may be changed on entry into the "Open Contact List" state so that the device enters the "Scroll" state in which pressing the navigation key upwards or downwards will cause the displayed part of the contact list to scroll upwards or downwards. This operation may be repeated, and each time the operation is performed the device transitions from the Scroll state to itself as the next state. Alternatively, if the user wishes to spell the intended contact, he may press one of the alphanumeric keys. Once the intended contact is displayed on the screen, the user may press a Start Call key, whereupon the device transitions to the Start Call state. In this state the device will contact the local base station with the intended remote device number, and send required subscriber identity information from the SIM card for billing purposes. The device may alter the screen display in order to indicate to the user that the remote device is being contacted, and sound a ringing tone in the loudspeaker. Once the base station has transmitted an acknowledgement signal to the device to indicate that a connection has been made with the remote device, the device transitions to the Talk state in which the microphone and loudspeaker are switched on in order to enable the user of the device to converse with the user of the remote device. After sending and receiving an audio data packet the device will transition to the Talk state as the next state so that the conversation may continue as long as desired. At the end of the telephone conversation, on pressing of the appropriate key on the device or the remote device, the device will transition to the End call state whereupon the microphone and loudspeaker are switched off, the screen display reverts to the default display, and the logical connection of the device to the base station is terminated. Any necessary data for billing is sent to the local base station for onward transmission to the appropriate local network server. Once the necessary operations have been completed, the phone reverts to the Idle state.

As another example of operation of the device, the user may send an SMS message to a recipient by pressing an appropriate key on the keypad or scrolling through functions of the device until the SMS editor function is reached and activating that. The device transitions from the Idle state to the "Open SMS Editor" state which allows the user to add characters defining text or recipients of the message. The device may be caused to transition to the Add Recipient state by pressing an appropriate key whereupon a list of recipients may be displayed on the screen and the list may be scrolled up or down until the correct recipient is shown. Recipients may be added by keying in the appropriate characters. Depressing one of the keys may cause the device to transition to the "Add Word" state where the screen may display a blank box for insertion of a text message. The Add Word state may transition to itself once any character has been included so that the text message may be built up. Once the text message has been completed, the user may depress a "send" key which will cause the device to transition to the Send SMS state. Once in the Send SMS state, the device will compile the data packet, send it to the base station and await an acknowledgement of receipt by the recipient from the base station or an error message if unsuccessful. Billing data may also be sent to the base station. Once the message has been sent the user may cause the device to enter the Quit SMS editor state whereupon the device will revert to the Idle state.

With some devices to be tested, it is possible that different state spaces might exist under different conditions. For example, in the case of the cell phone, the states in the state space might depend on the country code of a foreign exchange or a roaming contract, as a result of which some but not all the possible states may be present.

Verification Software

Overview of Verification Software

FIG. 4 shows the principal components of the verification software stored in the computer 30 for verifying the software of the cell phone 39.

The verification software has a number of blocks of code 82a to 112a, which will be referred to as state modules. The state modules 82a to 114a correspond respectively to the modules 42 to 74 of the mobile phone (and thus to the states 82 to 114 of the state diagram shown in FIG. 5). Sets of action commands 82b to 114b are associated respectively with the state modules 82a to 114a.

In operation, a control module 120 causes the state modules to be selected in a large number of different pseudorandom sequences. When a particular state module 82a to 114a is selected, the action commands 82b to 114b associated with it cause a command to be sent to the cellphone 39 to cause the corresponding functional module 42 to 74 to be activated. Thus, the activation of the state modules 82a to 114a in a particular sequence causes the corresponding functional modules 42 to 74 of the cell phone to be activated in the same sequence. That is to say, the cell phone is caused to transition through the state diagram of FIG. 5 in the same pseudorandom sequences as those in which the state modules are selected.

The verification software 29 also includes a coverage analysis module 164 which records which of the state modules 82a to 114a (and therefore the functional modules 42 to 74) have been called, and how many times they have been called, during a testing operation in which many sequences are generated. The coverage analysis module 164 is also operable to monitor for and record the occurrence of specific sequences which may be predefined by the user of the system.

An error logging module 166 logs errors which have arisen when the functional modules 42 to 74 are called during the testing sequences. To enable the cause of errors to be identified, the control module 120 causes the device 39 to transition through the different sequences of its states in a manner which is repeatable. Thus, if errors in the functionality of the device 39 are detected the sequence of states which caused the error can be identified by re-running the sequences and, for example, using where necessary a debugging tool.

The cell phone includes an input interface 164 for receiving from the verification software the commands for activating the functional modules 42 to 74 and an output interface 162 for transmitting to the verification software data indicating errors which have arisen, for logging in the error logging module 166.

State Modules

Figure 6:
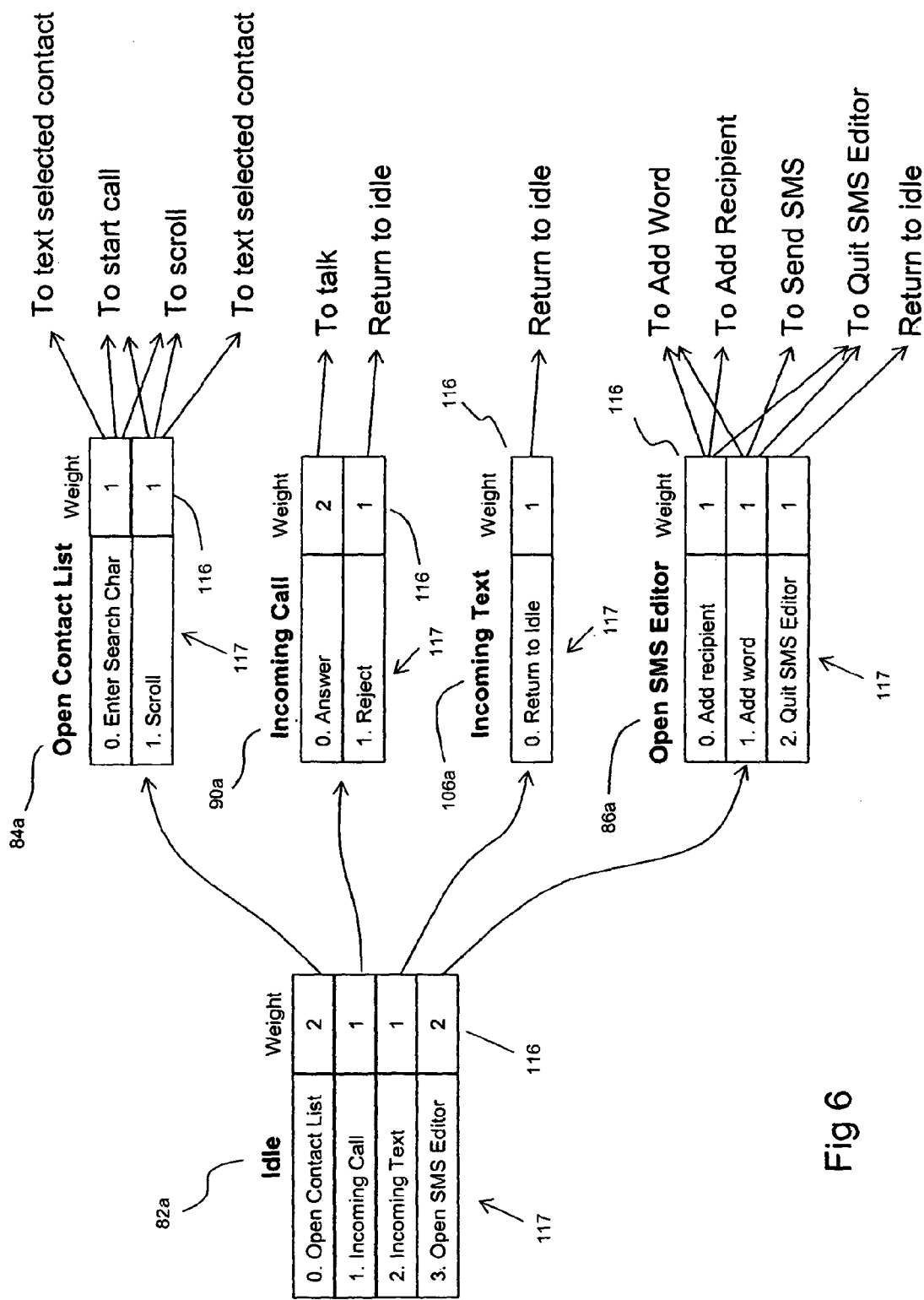
FIG. 6 shows some of the commands of the verification software shown in FIG. 5.

FIG. 6 illustrates schematically, by way of example, the structure of the state modules. Although FIG. 6 only shows state modules 82a, 84a, 86a, 90a, and 106a, all of the state modules 82a to 114a are similarly constructed. Thus, an understanding of the structure of the state modules which are illustrated in FIG. 6 will also provide an understanding of how the other state modules are constructed.

As previously indicated, each state module comprises a block of code. Each of the blocks of code comprises one or more instructions 117, there being a respective different one of the instructions 117 for each of the possible next states. The number of instructions 117 in each state module therefore depends upon the number of possible next states. For identification purposes, and as seen in FIG. 6, the instructions 117 in each state module 82a to 114a are numbered 0 to n−1, where n is the number of possible next states. The reason for numbering the states 0 to n−1 rather than 1 to n will become apparent later. However, it should be understood that this is not an essential feature of the invention and any suitable numbering system may be used for identification of the individual instructions in each state module.

Thus, in the present example, the Idle state module 82a has four instructions 117, one for each of the four possible next states, namely:
0 Open Contact List
1 Incoming Call
2 Incoming Text
3 Open SMS Editor The "Open Contact List" state module 84a has two instructions 117, one for each of the two possible next states of the state diagram namely:
0 Enter Search Character
1 Scroll Similarly, the "Incoming Call" state module 90a has two instructions 117, namely:
0 Answer
1 Reject The "Incoming Text" state module 106a has only a single instruction 117 to return the phone to "Idle" because "Idle" is the only possible next state The "Open SMS Editor" state module 86a has three instructions 117, one for each of the three possible next states, namely:
0 Add Recipient
1 Add Word
2 Quit SMS Editor The instructions 117 in each block of code constituting a state module may include fields 116 for storing a respective weighting factors or "weights" for each of the next states for determining the relative probability of transitioning to that next state.

For example, in state module 82a, the weighting for progressing to state 84 (Open Contact List) and state 86 (Open SMS Editor) is set at two, while the weighting for states 90 (Incoming Call) and 106 (Incoming text) remains at one, so that the probability of the system progressing to either of the Open Contact List state and Open SMS Editor state is ⅓, while the probability of progressing to either of the Incoming Call and Incoming Text states is ⅙.

The value of the weighting factors 116 may be selected by the user of the verification apparatus. Thus, by appropriately selecting the values of the weighting factors 116, the user of the apparatus influences the states through which the system progresses during a test.

Control Module

Figure 7:
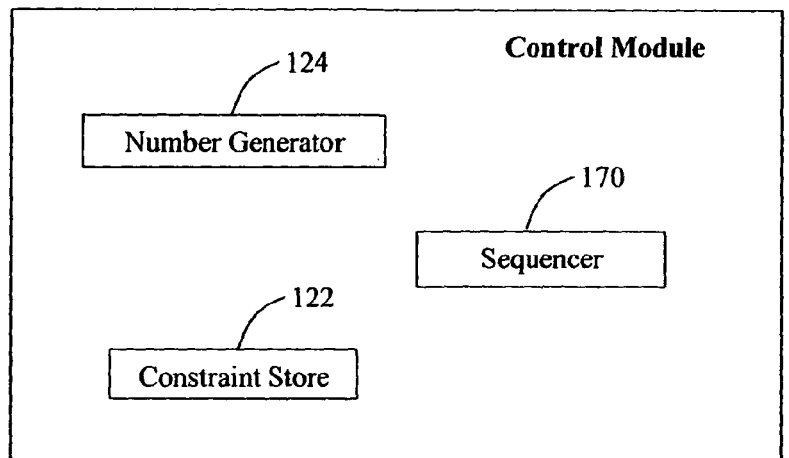
FIG. 7 is a functional block diagram of the control module shown in FIG. 4 in greater detail.

As shown in FIG. 7, the control module 120 includes a number generator 124, which generates deterministic sequences of pseudorandom numbers, a constraint store 122 which stores constraints which may be applied to selection of "next states" to which the system may transition and a sequence generator 170 which defines the sequence of operations performed by the control module 120.

Sequence Generator

At the beginning of a testing operation, the sequence generator 170 activates the number generator 124 and selects the "idle" state module 82a, because in the cell phone example under discussion the "idle" 82 is assumed to be the first state that should be called. Thus, initially, the "idle" state module is the "current" state.

Thereafter, for each "current" state (including the initial "idle" state), the sequence generator 170 selects the "next" state by performing the following steps:
Step 1 Check constraint store 122 for constraints on selection of next state.
Step 2 Obtain the next number from pseudorandom sequence generated by generator 124.
Step 3 Constrain number obtained at Step 2 to a constrained value of from 0 to n−1, in which n is the number of possible next states, which complies with any constraint determined at Step 1 and which takes into account any relevant weightings 116.
Step 4 Use constrained value from Step 3 to select corresponding instruction 117 of current state.
Step 5 Use instruction selected in Step 4 to cause action commands 82b to 114b associated with the current state module to:
(i) transmit instruction to cell phone 39 to call the functional module 42 to 74 that corresponds to the "next state" identified by the instruction 117 selected Step 4, and
(ii) select the state module 82a to 114a that corresponds to the "next state" identified by the instruction 117 selected at Step 4,
thereby causing the cell phone and the state modules to transition to the selected next state.
Step 6 Return to Step 1 utilising the state selected at Step 5 as the current state.

Thus, by continuously repeating Steps 1 to 6, utilising at Step 2 of each repeat a new number obtained from the number generator 124, both the cell phone and the verification software are caused to transition through the state diagram of FIG. 5 in a multiplicity of different sequences.

Constraint Store

The constraint store 122 is arranged to enable an operator to enter and store constraints which he may wish to impose, or which may need to be imposed, upon the operation of the system. For example, it may be desirable in a particular test procedure to prevent certain of the state modules being activated in certain circumstances.

One example of such a constraint could be where the cell phone stores a monetary credit to be used for making telephone calls, in which case a constraint could be stored to prohibit the Start Call state 94 from being entered if the credit is below a certain level. A further constraint could be stored to prohibit entry to the Send SMS state 112 if the credit is below another level. Since SMS messages may cost less than telephone calls, the level of credit prohibiting entry into state 112 might be less than the level of credit prohibiting entry into state 94.

Constraints might also be provided to prohibit certain sequences of states under certain conditions.

Yet another example could be a constraint by which, in the event that a predefined condition arises, the system is returned to a specific predefined state. In the cell phone example, the occurrence of a low power level arising while the device is in a particular state, or as the device is being sequenced through a specific predefined sequence of states, might be employed to cause the device thereupon to return to the idle state or to enter a power down state (not shown in the drawings).

Thus, it will be appreciated that the constraints may change dynamically in response to predefined conditions that may arise as the system is operated.

Number Generator

As already mentioned above, control module 120 causes the device 39 under test (the cell phone in this example) to transition through a large number of different sequences of its states in a manner which is repeatable, so that if errors in the functionality of the device 39 are detected the sequence of states which caused the error can be identified. The number generator 124 generates the sequence of numbers used for selecting each next state in a manner which makes this possible.

Figure 8:
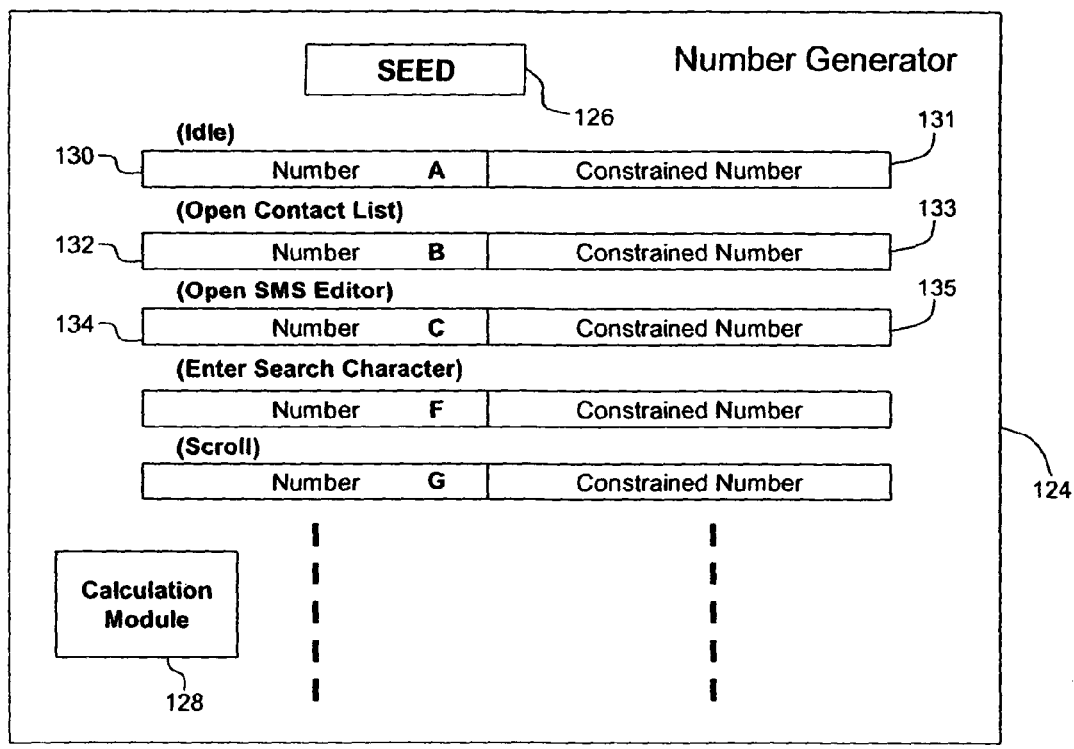
FIG. 8 is a functional block diagram of a number generator included in the control module of FIG. 7.

As shown in FIG. 8, the number generator 124 comprises a number store 126 for storing a randomly or arbitrarily selected seed number, a calculation module 128 for calculating a deterministic pseudorandom sequence of numbers from the seed number and a series of number stores 130, 132, 134 etc. each for storing a respective successive number in the deterministic pseudorandom sequence.

Each of the pseudorandom number stores 130, 132, 134 etc. is associated with a respective one of the state modules 82a to 114a and therefore, in turn, with a respective one of the states shown in the state diagram of FIG. 5. In FIG. 8, the number stores 130, 132, 134 etc. are labelled with the letters A, B, C etc to correspond with the labelling of the states in FIG. 5 with the same letters, to indicate clearly the correspondence between the pseudorandom number stores and the states.

The calculation module 128 may take any of a number of different forms, for calculating the deterministic series of pseudorandom numbers from the seed stored in seed store 126.

In the present embodiment, the calculation module 128 subjects the seed in store 126 to a mathematical operation or function in order to derive a value for the first number in the deterministic random sequence, and that number is then stored in the first pseudorandom number store 130, corresponding to state A. The number stored in the first pseudorandom number store 130 is then subjected, by the calculation module 128, to the same mathematical operation or function to derive the second number in the deterministic random sequence, and that second number is then stored in the second pseudorandom number store 132. The number stored in store 132 is then subjected to the same mathematical operation or function by the calculation module 128 and the result stored in the third pseudorandom number store 134, and so on until a pseudorandom number has been generated and stored for each of the states A, B, C . . . etc.

Associated with each pseudorandom number store 130, 132, 134 etc. is a respective constrained number store 131, 133, 135 etc. Thus, the constrained number stores 131, 133, 135 etc are associated respectively with the state modules 82a to 114a and each is used for storing a constrained number having a value between 0 and n-1 used by the sequence generator 170 and the state modules 82a to 114a for selecting the "next state", as described above.

Each constrained value is derived from the pseudorandom number which is stored in the associated pseudorandom number store 130, 132, 134 etc.

However, each number in the above described deterministic pseudorandom series comprises several bits, for example 16 bits. The decimal value of each 16 bit binary number is therefore far greater than the number n of instructions in each state module (see FIG. 6). Thus, each of these large numbers in the deterministic pseudorandom series has to be converted to a much smaller number, specifically, in the present example, a value of from 0 to n-1 where (as previously indicated) n is the number of possible of next states.

This can be easily achieved by, for example, dividing the 16 bit number by n and taking the remainder. Thus, if there are three next states possible, the value of n is 3, the 16 bit number is divided by three, and the remainder will have a value of 0, 1 or 2. This is then stored in the respective constrained number store, after being subjected to any further constraint dependent on the contents of the constraint store as described above and to any weighting in accordance the weight values stored in the state modules as illustrated in FIG. 6.

It is the simplicity of this operation for constraining the value of the number output by the number generator to a value suitable for selecting the next state that is the reason for identifying the instructions 116 in the state modules by the numbers 0 to n-1 rather than the numbers 1 to n. However, if it were desired to identify the instructions by the numbers 1 to n, the remainder value could be converted to a value of from 1 to n simply by adding 1 to the remainder value.

In the current embodiment, when a test is to be run, the set of pseudorandom number stores 130, 132, 134 etc. is first populated by the deterministic sequence of pseudorandom numbers calculated in the manner described above. Thereafter, the sequence generator 170 performs the sequence of operations described above, and in particular repeatedly performs the above defined Steps 1 to 6.

The first time a given state module 82a to 114a is selected, the pseudo-random number stored in the associated store 130, 132, 134 etc. is used for generating the required constrained number having a value 0 to n-1 (or 1 to n if this range of numbers used for identifying the instructions in the state modules). If a given state module is selected for a second time a new pseudorandom number is generated by subjecting the current pseudorandom number in the associated pseudorandom number store 130, 132, 134 etc. to the mathematical operation or function that the calculation module 128 performs as described above and storing the resulting new pseudorandom number back into the respective pseudorandom number store in place of the previous pseudorandom number. The new pseudorandom number is then used for deriving a new constrained value, in the manner described above, which then replaces the previous constrained value in the associated constrained number store 131, 133, 135 etc. This is repeated each time the given state is selected. Thus, the respective numbers stored in the stores 130, 132, 134 etc. each constitute a further seed for the generation of a further pseudorandom sequence of numbers, each such further sequence being associated with the respective state modules and successive numbers in the further sequence being used each time the state is called for determining which possible next state will follow.

Expressed differently, the seed number stored in store 126 may be regarded as the main seed for generating the sequence of numbers which are stored respectively in the stores 130, 132, 134 etc.; and the numbers stored in the stores 130, 132, 134 etc. may each be regarded as a subsidiary seed for generating a subsidiary deterministic pseudorandom sequence of numbers to be used when the respective state is selected a number of times.

Some or all state modules may have associated with them parameters or constraints which, during a test, should have their values varied in a deterministic pseudorandom manner. To achieve this, each such parameter or constraint may have associated with it a "sub-subsidiary" seed derived from the subsidiary seed of the associated state, and the sub-subsidiary seed is used for generating a sub-subsidiary sequence of numbers in which successive numbers are to be used each time the value of the parameter or constraint is to be varied.

Thus, with this arrangement, there is a hierarchy of seeds and deterministic pseudorandom sequences, as follows:
(a) At the top of the hierarchy is the main seed stored in seed store 126 and this is used by the calculation module 128 to generate the main sequence of numbers stored in the number stores 130, 132, 134 corresponding to the respective states.
(b) At the next level down, each of the numbers stored in the number stores 130, 132, 134 is a subsidiary seed which is used by the calculation module 128 to generate a respective subsidiary sequence, the successive numbers in which are used each time the corresponding state is called.
(c) At the third level down, a sub-subsidiary seed is generated by the calculation module for each parameter or constraint of the state which has to be changed in value during a test, and a sub-subsidiary sequence is generated from each sub-subsidiary seed to be used each time the associated parameter or constraint is to be changed in value.

This hierarchy may continue downwards for as many levels as needed in any given application.

Number stores (not shown) may therefore be provided in the number generator 124 (in addition to those shown) for each of the sub-subsidiary seeds and any further seeds lower in the hierarchy.

The sub-subsidiary seeds, and any lower seeds, may be generated and stored in their respective stores (which as already indicated are not shown) during the same number generating process as the subsidiary seeds, which in the current embodiment takes place prior to testing operations. One possibility for achieving this is for all of the subsidiary seeds to be generated and stored in the stores 130, 132, 134 etc. first, and the sub-subsidiary seeds, and any further seeds lower in the hierarchy, generated thereafter. An alternative possibility is for each sub-subsidiary seed to be generated and stored immediately after the subsidiary seed from which it is derived has been generated and stored. Likewise, each further seed lower in the hierarchy could be generated and stored immediately after the seed from which it is derived has been generated and stored.

Thus, in the current embodiment, each state module will have associated with it a subsidiary seed derived from the main seed; each state module having one or more constraints or parameters (such as weights) which are to be varied during testing operations will also have associated with it one or more respective sub-subsidiary seeds and possibly further seeds lower in the hierarchy; and during testing operations respective deterministic pseudorandom sequences may be generated by the calculation module from these subsidiary seeds, sub-subsidiary seeds and further seeds lower in the hierarchy.

Calculation Module

Figure 9:
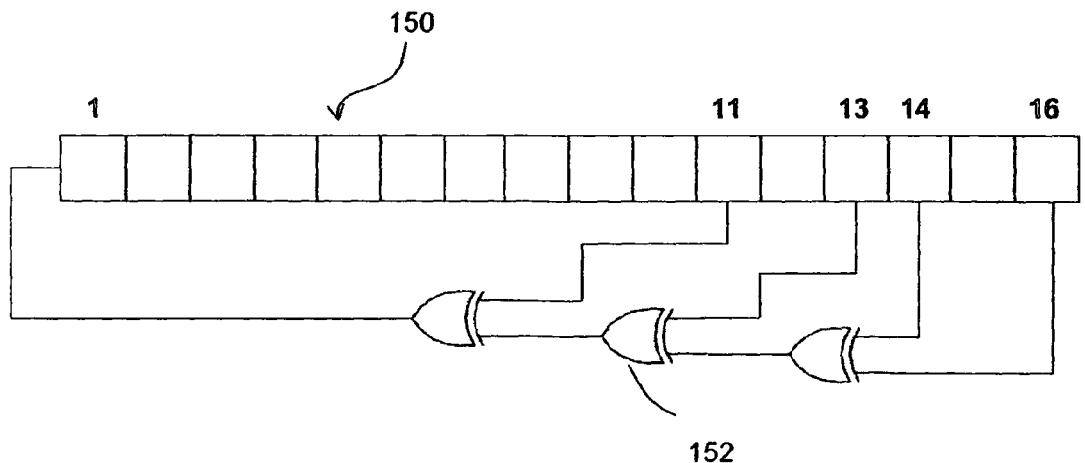
FIG. 9 is diagrammatic representation of a simple form of calculation module that may be employed in the control module of FIG. 7.

As shown in FIG. 9, a simple embodiment of the calculation module 126 comprises a linear feedback shift register 150 the contents of which are fed into the least significant bit of the register after having been subject to Boolean logic.

In this case, the $11^{th}$, $13^{th}$, $14^{th}$ and $16^{th}$ bits are tapped and sent to exclusive OR gates 152. This will give a feedback polynomial of $x^{16}+x^{14}+x^{13}+x^{11}+1$. A maximum-length linear feedback shift register will produce an m-sequence of output bits, that is to say, it will cycle through all possible $2^n-1$ states of the shift register except where all bits are zero. The shift register may be seeded by loading it with a sequence of values corresponding to the seed (or any function of the seed).

For example, the shift register shown in the drawing may contain, at the start, a random sequence of bits, say,
1001110010110010.

The $14^{th}$ and $16^{th}$ bits are 0 and are XOR'd to give 0. This bit is XOR'd with bit 13 to give 0, and the resulting value of 0 is XOR'd with bit 11 (which is 1) to give 1. Upon a clock signal, all bits are shifted to the right and the output (1) of the leftmost XOR gate is fed into left-hand end of the shift register. This operation results in the shift register containing the number
1100111001011001.

Repetition of the above operation will give the sequence:
0110011100101100.

This number is then subjected to the same operations to obtain a further number. That further number is then subjected to the same operations to obtain yet a further number. The resulting series stream of numbers may constitute the deterministic series referred to above. Alternatively, the numbers of the deterministic series may be obtained by selecting the number which exists in the shift register after a predetermined number of iterations for example after every two iterations or every 10 iterations or indeed after any predetermined number of iterations.

The consequence of generating a series of numbers in this way is that exactly the same series can be regenerated by starting from the same seed. It is in this sense that the series of numbers used for selecting the next states is referred to as a deterministic pseudorandom sequence. Thus the process is entirely deterministic and by knowing the original sequence, the seed, and the function performed on it to obtain the next and each subsequent number in the series, the resulting series can always be regenerated.

Although the linear feedback shift register 150 shown has a length of 16 bits, any other length may be employed provided that the random numbers generated will be sufficiently large to cover the entire number of states of the software under test. If the length of the shift register is too small, there is a possibility that only some of the states will be visited.

The linear feedback shift register 150 is preferably software implemented but it could alternatively be implemented in hardware.

In practice, a more sophisticated method of generating the deterministic pseudorandom sequence of numbers may be desirable. An example of such a more sophisticated method will be described later.

Summary of System so Far

From the above description, it can be seen that the verification apparatus of the invention causes the device under test to transition through its states in pseudorandom but deterministic sequences.

Pseudo-random but deterministic passage of the system through the state space in the manner described has the advantage that the system under test passes through the state space in a large number of pseudo-randomly selected sequences, thereby subjecting the system to wide and potentially exhaustive testing but, nevertheless, the sequences through the various states of the system can be repeated precisely by repeating the initial conditions, that is to say the seed and any constraints that are applied. Thus, if an error is observed or recorded as the system progresses through a state or sequence of states, it is possible return to the condition that gave rise to the error simply by running the apparatus again with the same initial conditions (seed and constraint(s)) as often as necessary, with a view to identifying the cause of the error.

In practice, a device under test will be subjected to a number, typically a large number, of test runs and a different value for the (main) seed stored in number store 126 will be used in each test run for generating the deterministic pseudorandom sequence of numbers. As a result, the pseudorandomly selected sequences through which the system under test passes through its state space will differ in each test run. Thus, when the system is subjected to a large number of test runs each with a different value for the main seed, the result will be that a vastly large number of different sequences through the state space will take place.

The value chosen for the main seed in any test run may be selected in any of a wide variety of different ways. For example, the user could simply input a randomly or arbitrarily selected sequence of digits having no connection with any particular matter or event; the digits could represent the current date and time, which has the advantage that the value would never be repeated; the digits could be derived from a variable such as ambient temperature combined with some other variable with a view to ensuring that the value of the seed is not repeated in different test runs.

Further, more rapid and greater coverage of the sequences through which the device under test may pass through its state space may be achieved by providing a number of samples of the device under test and causing each one to be tested using a different instance of the verification software. In this case, a different set of main seeds should be used in each instance of the software in order to maximise the coverage.

When multiple test runs are performed on the same device, or different instances of the verification software are used simultaneously or sequentially to perform different test runs on different examples of the device to be tested, it is possible to cause different test or test runs to focus on different areas of the state space. This can be achieved by using different weightings and/or constraints in different test runs and this may cause the verification software to focus on one or more specific parts of the state space dependent upon the weightings or constraints.

The manner in which operations performed by the verification apparatus are monitored, and any errors arising in the operation of the device under test are logged, in the present embodiment will now be described.

Coverage Analysis Module

Figure 10:
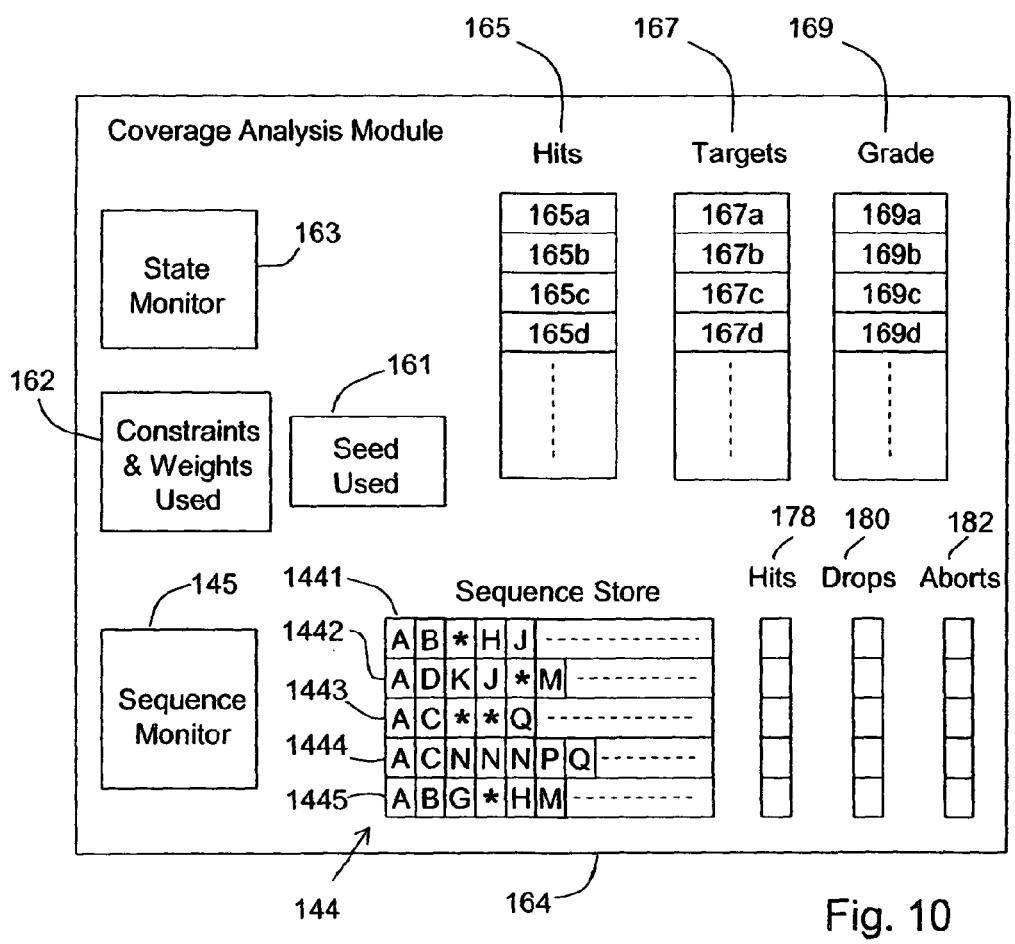
FIG. 10 is a functional block diagram showing the structure of the coverage analysis Module of FIG. 4.

With reference to FIG. 10, the coverage analysis module 164 comprises a store 161 which stores the value of the seed used in the test or test run whose coverage is to be analysed, a constraints and weightings store 162 which stores the constraints and weightings used in the test or test run, a state monitor 163 which monitors operation of the system to determine each of the states which is called in the test or test run and a hits store 165 comprising a set of memory locations 165a, 165b, 165c . . . etc. which correspond respectively to the states A, B, C . . . etc. During operation of the system, these memory locations store numbers which indicate the number of times that the respective state has been called in the test or test run which has taken place using the seed value in store 161. The number stored in a given location is incremented by the state monitor 163 each time that the state monitor 163 detects that the corresponding state is called.

A target hits store 167 comprises a set of memory locations 167a, 167b, 167c . . . etc., which correspond respectively to the states A, B, C . . . for storing operator entered numbers for indicating the minimum number of times (if any) that the operator wishes each respective state to be called during a testing operation. Grade store 169 similarly comprises a set of memory locations 169a, 169b, 169c . . . which correspond to the respective states and into which percentage values are entered by the system indicating the percentage of actual "hits" to the target number of "hits" recorded in the memory locations 165 and 167.

The coverage analysis module 164 also includes a sequence store 144 into which the operator can enter sequences of states which he wishes the system to monitor. As shown in FIG. 10, five sequences 1441 to 1445 are stored, the sequences to be monitored being indicated in the drawing by the capital letters A, B . . . etc that identify the individual states. The number of sequences stored in the sequence store 144 may vary widely and dozens or hundreds of sequences may be stored. Thus, large numbers of different sequences can be monitored. A sequence monitor 145 monitors the states which are called so as to detect each time any of the sequences stored in the sequence store 144 occurs.

It can be seen in FIG. 10 that some of the sequences shown in sequence store 144 indicate one or more states in the sequence by an "*". This indicates that the identity of that particular state in the sequence is of no relevance i.e. it is equivalent to a "wild card".

A set of memory locations 178 is provided, one for each sequence 1441 to 1445, for recording the number of times that each respective sequence is detected or "hit".

Another set of memory locations 180 is provided for recording the number of times each respective sequence stored in the sequence store 144 begins but does not complete because the sequence "drops" before completion. Drops are recorded if part of a sequence is recorded but the system then progresses to a different state for a legitimate reason so that only the first part of the sequence in the sequence store 144 is observed. For example, referring to FIG. 5, if the sequence A (idle), D (incoming call), K (answer), J (talk), M (end call) is defined in the sequence store, but a sequence actually observed was A (idle), D (incoming call), L (reject), this would be recorded as a "drop" 180.

A further set of memory locations 182 is provided for recording the number of times each respective sequence begins but aborts before completion. Thus, if part of a sequence in the sequence store was observed but the system crashed before the end of the sequence was observed, this would be recorded as an "abort" 182.

As will be appreciated, as the system progresses through a test, any given state may be called a number of times. For example, as the test proceeds, the actual sequence by which the system progresses through the states might be:

ABGGGICONNNPQABFH . . . .

One of the stored sequences in the sequence store 144 might be:

NPQA

In order to monitor for this stored sequence NPQA, which is a sequence of four states, every time the state N occurs in the actual sequence, the sequence monitor 145 starts a new monitoring operation in which it monitors the following three states to determine whether the sequence NPQA occurs. Thus, in the example under discussion with the actual sequence set out above the sequence monitor 145 will carry out three sequence monitoring operations, which overlap in time, as follows:

Operation 1: starting at first occurrence of N, detect that following three states are NNP and record a "drop".

Operation 2: starting at second occurrence of N detect that the following three states are NPQ and record a further "drop".

Operation 3: starting at the third occurrence of N detect that the following three states are PQA and record a "hit".

In practice multitudes of monitoring operations which overlap in time will be performed by the sequence monitor 145 and the number of monitoring operations taking place as the system progresses through a test will be continuously changing.

Coverage Report

Each time a test or test run is completed, the values in the stores 161, 162, 165, 167, 169, 144, 178, 180 and 182 are stored in a report store (not shown) together with other data relevant to the test or test run, such as the time and date of the test or test run, the name of the user, and the identity of the device under test. Thus, after the verification software has been used for carrying out a number of tests or test runs, the report store will store a corresponding number of reports, one for each test or test run.

Figure 11:
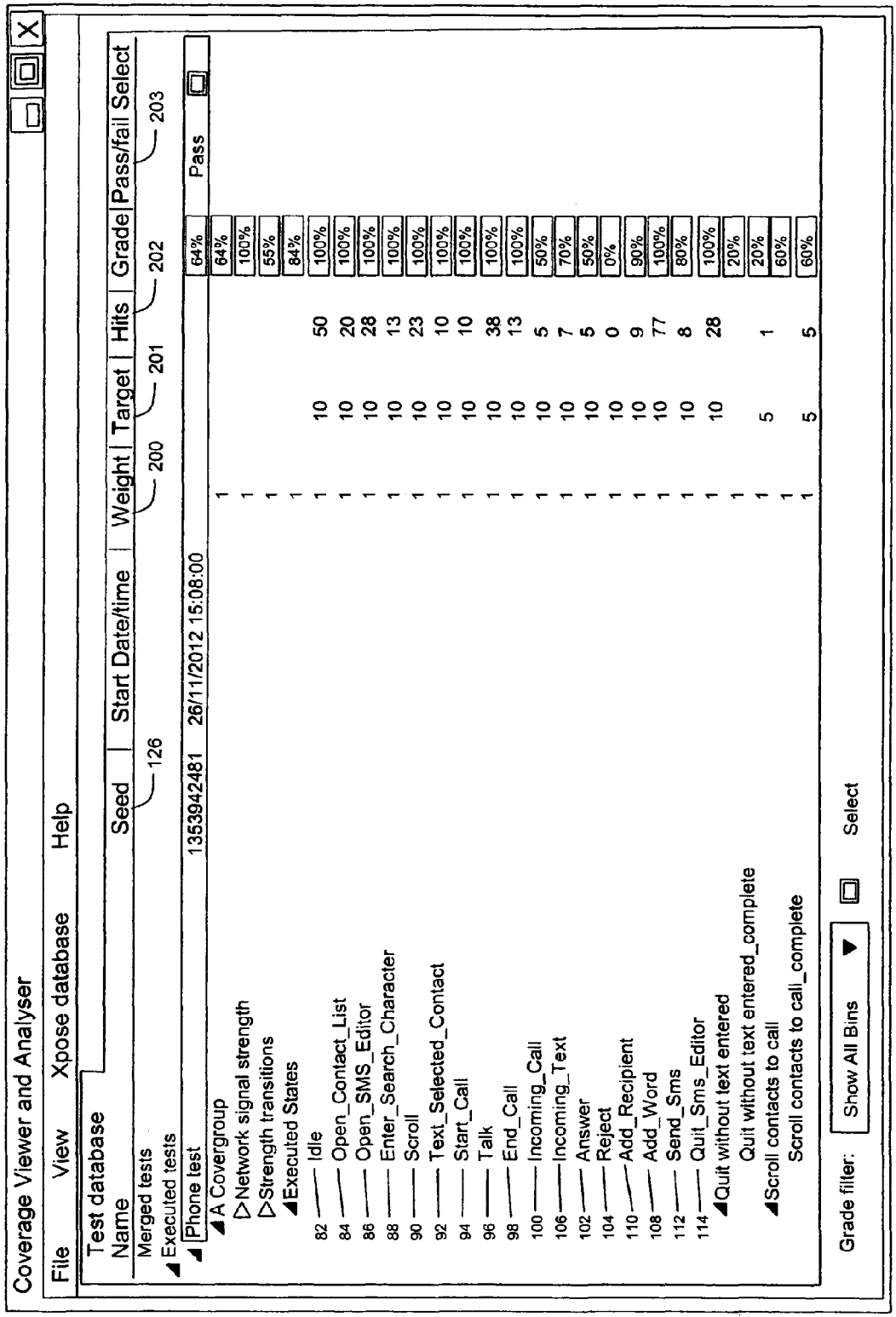
FIG. 11 shows an example of the output of the coverage analysis module.

FIG. 11 is a diagram showing an example of a test report produced by the verification software presented as a display screen output or a print on paper. As can be seen, the report in FIG. 11 relates to the embodiment of the invention described in detail, and thus shows the results of a test of a mobile telephone. Thus, the report store (not shown) includes fields for all of the data shown in the report of FIG. 11.

This report indicates the seed 126 that was employed in the number generator 124 in order to generate the pseudo-random numbers that controlled the sequence of the states through which the system passed, and other relevant data relating to the test such as the date and time it was run.

On the basis of the data stored in the above described memory locations in the coverage analysis module 164 during the test in question, the report also indicates the states 82 to 114 through which the system passed (identified by name "Idle", "Open_contact_list" etc.). In addition, the weighting 200 that was applied to the instructions in the state modules (in FIG. 11, a weighting of 1 in each case) and the target number of times 201 that the system would need to pass through each state in order to enable the tester to have confidence that the software has been adequately tested. The report also indicates in the next column 202 the actual number of times the system passed through each state (identified as "Hits" in the heading), and the proportion of times the system passed through the relevant state, expressed as a percentage, compared with the target number of times or hits.

As can be seen from the report, many of the states were reached more often than the target value, indicating that those states have been adequately explored.

However, some of the states, for example the "incoming_call" state and "send_Sms" states were encountered fewer times than the target (50% and 80% respectively), and one of the states (the "reject" state) was not encountered at all.

Thus, while some of the states have been adequately covered, some clearly have not. In this case it would be desirable to re-run the test in order to complete the coverage of the state space to an adequate extent. The test could be rerun with the same seed but with different weightings. For example, the "reject" state could be specified in the code for generating the state diagram with a greater weighting. If any states higher up the tree for example "incoming_call" are specified with a higher weighting in the state diagram generating code, a number of states lower down the tree such as "incoming_call", "answer" and "reject" may all be visited more often. Alternatively, the test could be re-run with a different seed either with the same weightings or with different weightings for focusing on the states not covered in the first test.

It may be noted that many systems under investigation will be so complex that the verification software could run almost indefinitely without the system transitioning to all the possible states. If the software were allowed to run for a long period of time before terminating it, it would be necessary to run it for an equally long period in order subsequently to determine the coverage of the state space and to observe any possible errors. In view of this, it is preferred to terminate operation of the verification software at a convenient point.

Error Logging Module

The error logging module 166 of FIG. 4 may be provided by a counter that is incremented whenever an error is detected during execution of the verification apparatus, for example by counting the number of aborts 182. Also, the errors may be identified by the number to which the value in the counter is incremented when the error occurs.

Error Detection and Recording

The way in which an error is detected may be conventional and will depend on the particular software or device under test. Such error detection will normally be determined by the manufacturer of the software or device under test, and may include detection of software crashes, comparison against reference models, comparison of data before and after an operation, or by other methods.

The most obvious indication of an error in the software is if it causes the system to crash, for example by terminating in an unplanned manner or by trying to perform an illegal operation. A crash may also be regarded when the software performs an unexpected exit.

Another form of checking is called "golden reference comparison" or "golden reference model". An abstract model of the desired behaviour of the system is developed or received as part of the specification. In this case the same stimulus is passed to the software under test and to the golden reference, and the results are compared. The comparison should result in a pass or fail indication depending on whether the software has performed in the same way as when subjected to the golden reference.

Yet another form of detecting errors is so-called "scoreboarding". This involves essentially a comparison of data before and after it has been subjected to an operation.

Another form of error determination is by means of assertions. An assertion is an autonomous check that may be performed at a specific time or on an event. Examples of typical assertions are:

a) A given parameter must lie in a specified range;
b) A given parameter must be less than the sum of some other parameters;
c) A given parameter must not deviate from its previous value by more than a given amount;
d) If the previous system state was "x" then the current state must be "x" or "y".

Assertions may be static, that is to say, only considering current parameters, or temporal, i.e. considering past values, and may be embedded within each of the state/sequence items.

Modifications

Alternative Calculation Module

As indicated above, the linear feedback shift register shown in FIG. 9 is a relatively simple device for calculating a deterministic sequence of pseudo-random numbers may be generated. Preferably, however, a more complex process is used for calculating the deterministic pseudorandom sequence of numbers. Preferably the process selected should exhibit a maximally long sequence and include all possible values, so that, for example, for a sequence of 32 bit numbers there should preferably be 2^32 different values in the sequence.

To achieve this, a preferred form of the calculation module 128 is a linear congruential generator where each number in the deterministic pseudorandom sequence is generated from the previous number in the sequence by multiplying it by a coefficient, adding a constant and taking the modulo value, i.e. by employing the equation:

$$x_n = (ax_{n-1} + c) \bmod m \quad \text{Formula (1)}$$

where a, c and m are integers and m is a value which is a power of 2 e.g. 16, 64, 256, 1024. (i.e. 2^32)

c is odd and greater than 0 a=(4*N)+1 where N is any integer number greater than 0 so possible values of a are 5, 9, 25, 161, etc . . . .

Thus, assuming a 32 bit operation then there are approximately 2 billion possible values for c and approximately 1 billion possible values for a.

It is possible that the least significant bits of the number generated by formula (1) may repeat within a relatively short period. In this case it may be preferred to generate two pseudorandom numbers in this way using two different seed values, and to concatenate them after discarding the least significant bits. Thus, for example a single 16 bit number may be employed by taking two 16 bit numbers generated in this way, discarding the eight least significant bits from each number and concatenating the two eight bit numbers so formed to generate a single 16 bit number.

Another alternative possibility for the calculation module 128 is a Galois linear feedback shift register, which may generate the pseudorandom sequence by the following calculation:

$$S_n = (S_{n-1} >> 1) \char`\^ ((0 - (S_{n-1} \& 1)) \& 0xd0000001) \bmod m$$

$$S_{n-j} + S_{n-k} \quad \text{Formula (2)}$$

Another alternative is a Lagged Fibonacci generator which would generate the sequences by performing the calculation:

$$S_n = (S_{n-j} + S_{n-k}) \bmod m$$

where $S_{n-j}$ and $S_{n-k}$ and are the (n-j)th and (n-k)th elements from the Fibonacci series.

Alternative Number Generator

Figure 12:
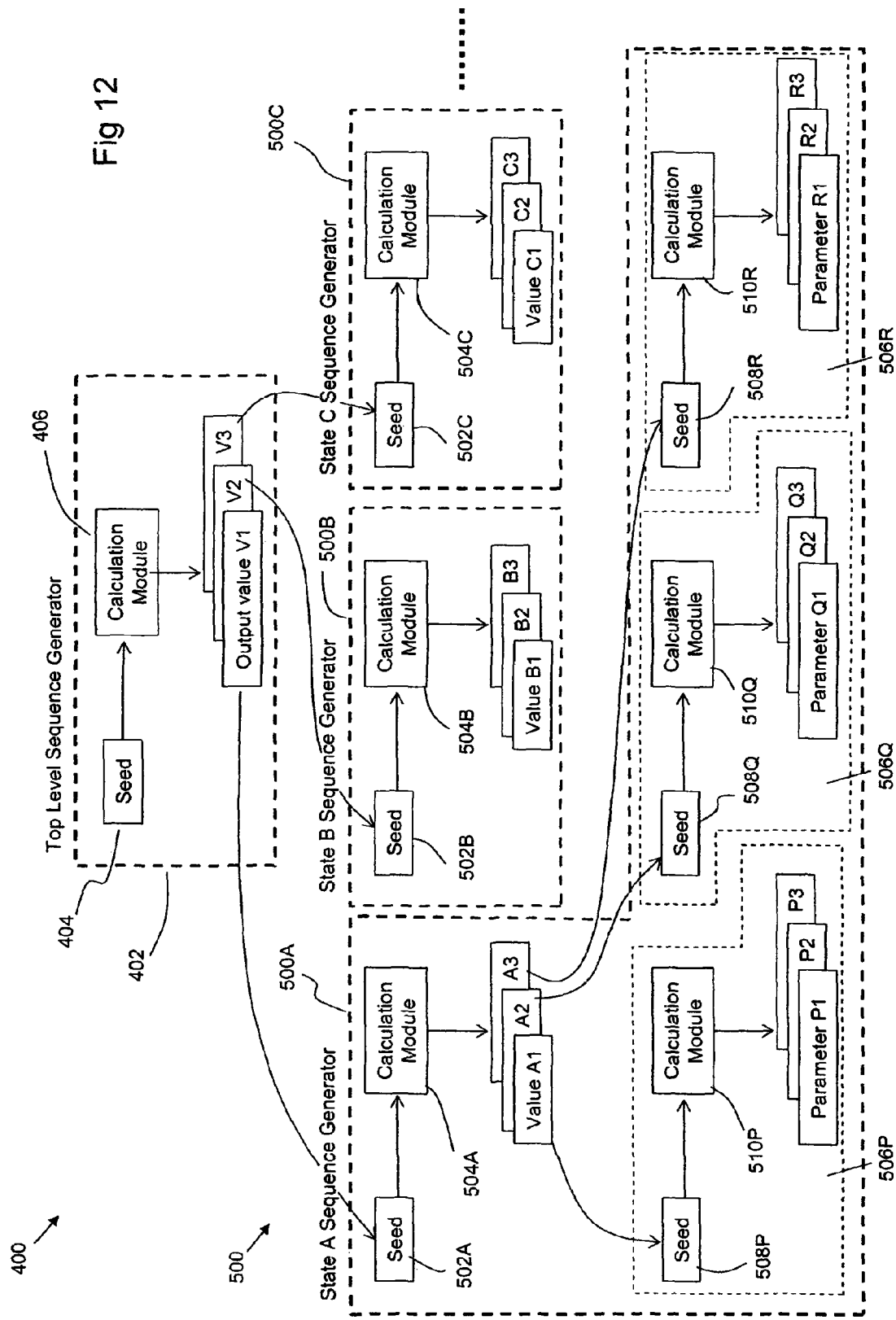
FIG. 12 is a functional block diagram of an alternative, more complex, form of number generator to that shown in FIG. 7.
Figure 13:
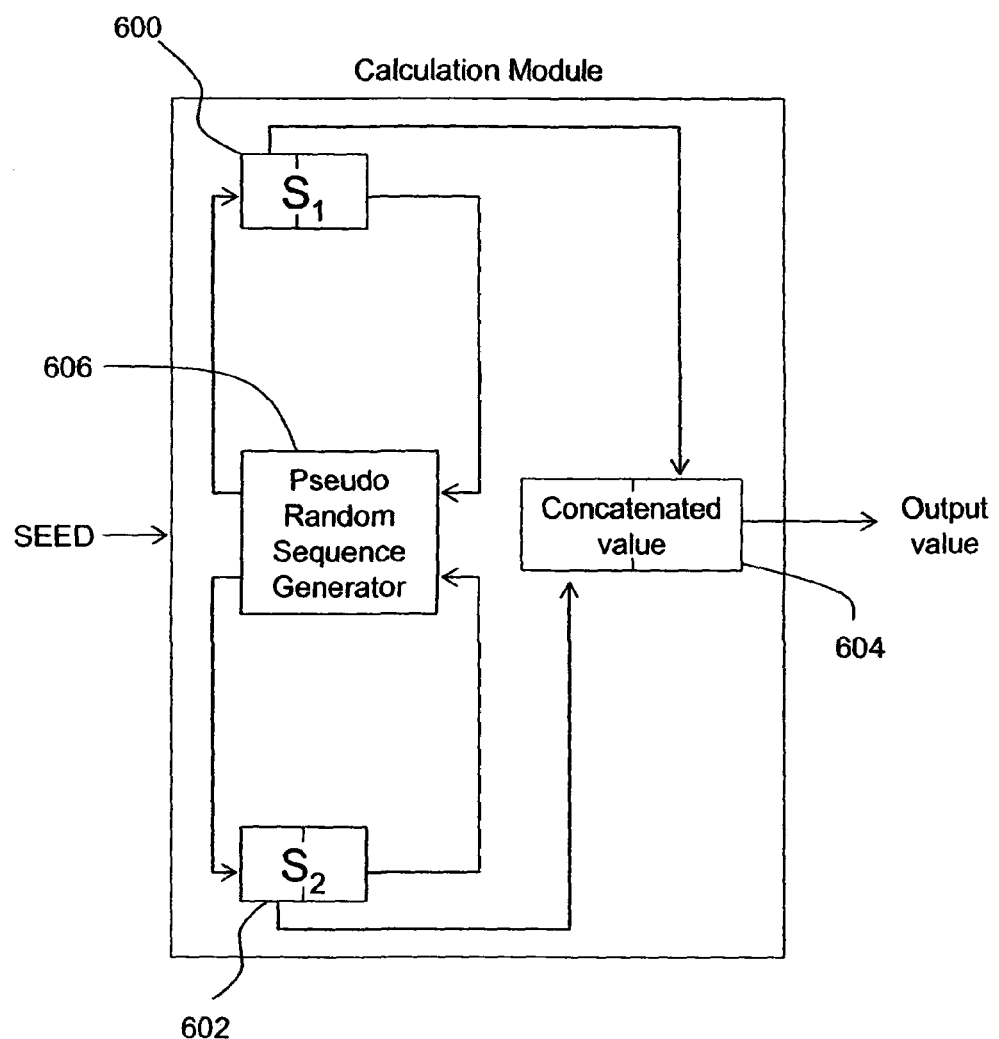
FIG. 13 is a functional block diagram of the calculation module included in the number generator shown in FIG. 12.

FIGS. 12 and 13 show another form of the number generator (identified by reference numeral 124 in FIG. 7) which may be used in the invention and which is more complex than that shown in FIG. 8.

The number generator 400 shown in FIG. 12 comprises a first pseudorandom binary sequence generator 402 and a set of further pseudo-random binary sequence generators 500. The number of sequence generators in the set 500 is equal to the number of states, there being an individual sequence generator in the set 500 for each respective different state. For simplicity, FIG. 12 only shows sequence generators 500A, 500B, and 500C which correspond respectively to the states A, B and C.

The sequence generator 402 comprises a main seed store 404 which (like the seed store 126 in FIG. 8) receives a randomly or arbitrarily selected seed value which may be entered by the operator, for example as described above. The seed value entered into seed store 404 is supplied to a calculation module 406 which generates a sequence of output values V1, V2, V3, etc. The way in which this is done will be described with reference to FIG. 13.

The output values V1, V2, V3, etc are supplied respectively to the state sequence generators 500A, B, C etc, each of which uses the respective value V1, V2, V3, for generating a deterministic sequence of pseudorandom numbers to be used by the state to which it corresponds. Thus, although FIG. 12 only shows output values V1, V2 and V3, there will in practice be a separate output value Vn for each respective different state.

The state sequence generators 500A, 500B, 500C etc each comprise a respective state seed store 502A, 502B, 502C etc to which the respective output value V1, V2, V3, etc is supplied. These values are applied as respective input values to calculation modules 504A, 504B, 504C etc. included in the respective state sequence generators 502A, 502B, 502C. The calculation modules 504A, 504B, 504C etc are identical to each other and to the calculation module 406, and each is operative to produce a respective set of output values A1, A2, A3 etc; B1, B2, B3 etc; and C1, C2, C3 etc.

In FIG. 12, it is assumed that state A has associated with it three parameters P, Q and R whose values are to be varied in a pseudo-random manner each time the state is called. Thus, state sequence generator 500A includes three parameter sequence generators 506P, 506Q and 506R which have parameter seed stores 508P, 508Q, 508R which respectively receive the values A1, A2 and A3, and calculation modules 510P, 510Q and 510R. Each of these calculation modules is also identical to the calculation module 406 and is operative to utilise the value stored in the respective seed store 508P, 508Q, 508R to calculate a respective set of parameter values P1, P2, P3 . . . etc; Q1, Q2, Q3 . . . etc.; and R1, R2, R3 . . . etc.

FIG. 12 assumes that states B and C do not require the generation of any varying parameter values.

When the system is initialised in preparation for running a test, the calculation module 406 is activated to populate the seed stores 502A, 502B, 502C . . . etc. with the respective values V1, V2, V3 . . . etc. Thereafter, calculation module 504A is activated to populate the seed stores 508P, 508Q and 508R with the values A1, A2 and A3 respectively. Also, similar seed stores are similarly populated in any further state sequence generators (not shown) which correspond to any states requiring pseudo-random variation of parameter values during the running of a test.

The calculation modules 504B and 504C do not have to be activated during the initialisation process. However, the first time state B is to be called, calculation module 504B is activated to generate its first output value B1 which is then used to select in a pseudorandom manner and as described above the next permissible state. The next time state B is called, the calculation module 504B is again activated and this time it generates value B2, and so on. Thus, each time state B is called a new output value Bn is generated by the calculation module 504B. Calculation module 504C is similarly activated to generate a new output value Cn each time state C is called. As with the numbers described with reference to the number stores 130, 132, 134 etc. in FIG. 8, the values Bn and Cn will be constrained to values in the range 0 to n−1, where n is the number of possible next states before being used to select the next state.

In the case of state A, in the example shown in FIG. 12, the first three values generated by the calculation module 504A were used during initialisation to populate the seed stores of the parameter generators. Accordingly, the first time that state A is called in the testing process, the calculation module 504A is activated to generate a new value A4 (not shown) and this value A4 is used by the state module in the determination of which of the next permissible states is to be selected. The next time state A is called, the calculation module 504A is again activated, and it will generate the next value A5 in the deterministic pseudorandom sequence and this will be used in the determination of which of the permissible next states is selected. The value A4 and subsequent values will be constrained similarly to the values Bn and Cn as described above to enable them to be used for selecting from amongst the next possible states. However, the values A1, A2 and A3 are not constrained because, as described above, they are used as seeds for the parameter sequence generators 506P, 506Q and 506R.

New values of P, Q and R are similarly calculated each time state A is called.

By means of the hierarchical arrangement of sequence generators shown in FIG. 12, seed values are propagated, during initialisation, downwardly in the hierarchy from the input seed value in store 404 so that each calculation module will generate a deterministic sequence of pseudorandom numbers used for the selection of "next states" and selection of parameter values.

This hierarchical arrangement can continue downwardly where further parameter values might be needed at a lower level in the hierarchy than shown in FIG. 12. Thus, for example, if there are parameter values below the parameter values P, a further parameter sequence generator or generators could be provided receiving as seed values the initial values output by calculation module 510P.

As shown in FIG. 13, each calculation module shown in FIG. 12 comprises first and second number stores 600, 602 which store values S1 and S2 respectively. At initialisation:
S1=seed value input to the calculation module; and
S2=0–S1

Concatenated value store 604 receives the bits that make up the most significant half of S1 and S2 respectively and outputs the concatenated value as the output value which, in the case of calculation module 406 is V1 and in the case of the other calculation modules is respectively A1, B1, C1, P1, Q1, R1 etc.

The calculation module also includes a pseudo-random sequence generator 606 which is preferably a linear congruential generator as previously described. However other functions are possible as already described. Generator 606 takes the value S1, applies its function to it and replaces the old value of S1 in store 600 with the newly calculated value of S1. It separately takes the value of S2, applies its function to it and replaces the current value of S2 with the newly calculated value of S2. These new values of S1 and S2 are then used in exactly the same way as the previous values i.e. the upper halves of them are concatenated in concatenated value store 604 and output as the next value Vn in the sequence. This is repeated each time the calculation module is activated so that each calculation module is thus operative to produce a deterministic pseudorandom binary sequence.

The embodiment of the invention which utilises a number generator 400 as shown in FIG. 12 preferably includes means by which the operator can control the values of the seeds in the seed stores in the set of state sequence generators 500. For example, after running a first test with a first main seed value provided in store 404, it may be desirable to run a second test in which a new main seed value is used in the top level sequence generator 402 but the state seed values in selected ones of the state sequence generators are fixed at the values given to them in the first test. The result of this would be that, in the second test, the states whose seed values have been fixed would behave in the same way as in the first test but the remaining states would follow sequences dependent upon the values Vn output by calculation module 406 in the second test, which will be different from those output in the first test.

Expressed differently, a number of test runs could be carried out in which the behaviour of a selected part of the state space is kept constant whereas the behaviour of the remaining part of the state space changes each time a new test is run.

Further, additionally or alternatively, facilities for fixing the values of the parameter seeds could be provided, making it possible to run a series of tests in which the values of selected parameter seeds are kept constant whilst permitting other parameter seed values and/or the state seed values to change with each new value of the main seed.

In some testing routines, it may be desirable to permit a user to manually select one or more of the state seed values and/or one or more of the parameter seed values and for those manually selected values to remain fixed during a number of test runs each using a respective different main seed value.

Thus, although the number generator 400 comprises a hierarchy of seed stores which, in the initialisation phase, receive seed values that are propagated downwardly through the hierarchy from the main seed value, thereafter, during a test run, the state sequence generators and the parameter sequence generators all operate independently of each other. It is this property of independent operation of the state and parameter sequence generators which makes it possible to fix the seed values of selected state and/or parameter sequence generators as described above without affecting the operation of the other state and/or parameter sequence generators.

Hence, with this facility, it is possible to run successive tests in which the sequences through parts of the state space remain fixed and the sequences through other parts of the state space vary, substantially facilitating the identification of areas of the state space, or of transitions through the state space, which may be causing incorrect operation of the device or system under test.

The facility for fixing or manually inserting the seed values in selected state and/or parameter sequence generators may comprise a graphical user interface (not shown) to enable selection of the states or group or groups of states whose seed values are to be kept constant. Such a graphical user interface might, for example, include an interactive representation of the state diagram for enabling states and/or parameters, and their seed values, to be selected or determined. Alternatively, the graphical user interface could comprise a set of fields for defining the required values.

The number generator described with reference to FIGS. 12 and 13 is thus superior to that described with reference to FIG. 8.

Figure 14:
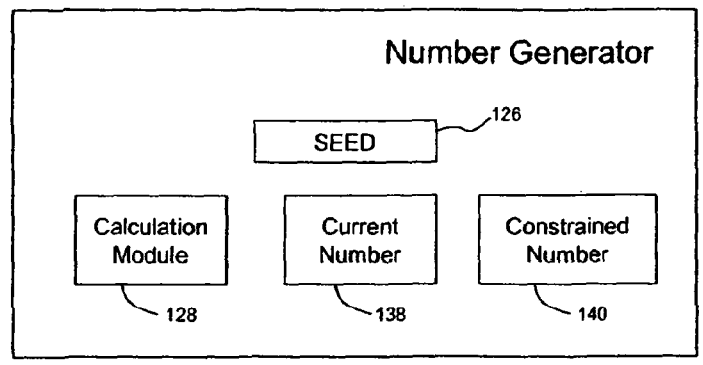
FIG. 14 is a functional block diagram of another alternative form of number generator to that shown in FIG. 7.

Further Alternative Forms of Number Generator

Where a device or system is to be tested which does not require the relative complexity of the number generators described with reference to FIG. 8 and FIG. 12, a much simpler alternative form of number generator may be used, for example a number generator as shown in FIG. 14.

In FIG. 14, a single number, the current number 138, is generated by the calculation module 128 starting with the seed 126 and is used to determine the next state to which the system progresses irrespective of the previous state through which the system has passed. The current number is used to generate a constrained number 140 having a value appropriate to the number of possible next states as described above.

The calculation module 128 is then used to generate a new current number each time the system progresses through a state.

Thus what is in effect happening in this embodiment is that for each node or state shown in FIG. 5, the control module 120 takes as its seed, for generating a number to pseudo-randomly select the next state, the pseudorandom number employed in the previous state or higher level.

Further, there are a number of other possibilities for different forms of number generator or modifications of the number generators so far described.

For example, in FIG. 8, 12 or 14, instead of changing the value of the initial seed for each test run, it would alternatively be possible to change the nature of the function, or some aspect thereof, performed by the calculation module 128 or 406. In embodiments in which this module comprises a linear congruential generator this could be achieved by changing the values of the constants in Formula 1 above. Thus, each new set of values for the constants would (referring to FIG. 12) result in a different set of output values Vn being produced by the calculation module 406 even though the value of the seed in store 404 is not changed.

Further, although in the embodiment described with reference to FIG. 12, all of the calculation modules are identical, it would be possible for different ones of the state and/or parameter sequence generators to use respective different algorithms in the calculation modules for the generation of the respective different sequences.

Networks and Tags

Although in the cell phone example of the system as described above, all of the states and sequences of states being monitored arise in the same device (the cell phone), the system can also be used for monitoring the states of a number of devices simultaneously, such as devices or nodes in a network. In such a case, it may be necessary to distinguish between the states which arise in the different nodes. This can be achieved by applying different identification tags to the data originating from respective different nodes all devices. Thus, for example, the sequence monitor would in such a case be modified to look for sequences in which all of the states have the same identification tag.

Alternative Implementations of the Invention

Figure 15:
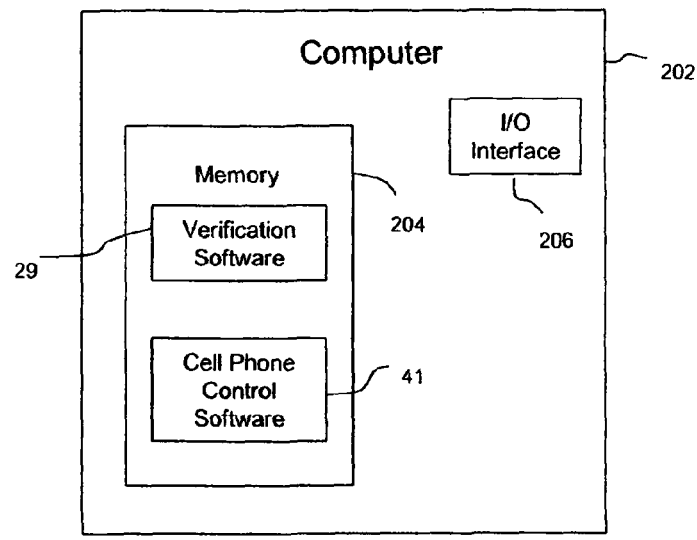
FIGS. 15 and 16 are block diagrams showing alternative arrangements for system verification according to the invention.
Figure 16:
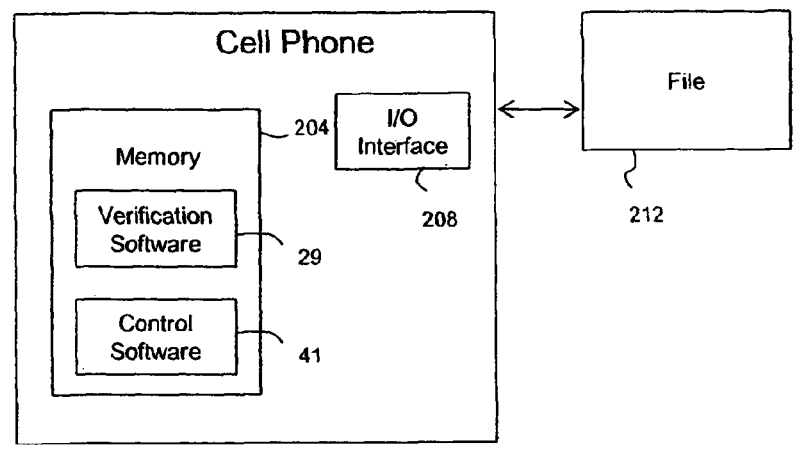

FIGS. 15 and 16 are block diagrams showing schematically alternative embodiments of the invention.

In FIG. 15, instead of the computer with the verification software sending data to the physical cell phone being tested and receiving data from it, the cell phone software, or a simulation thereof, including the data of the modules 42 to 74 are loaded into the memory 204 of the computer 202 that holds the verification software by means of I/O interface 206. Testing is then done by running the simulation software under control of the verification software.

FIG. 16 shows an alternative arrangement in which the verification software 29 has been loaded into the memory 204 of the cell phone and the verification software can be run on the cell phone. An I/O interface 208 in the cell phone may be employed to load the verification software into the cell phone memory and to receive coverage data and error logging data from the cell phone as a file.

The verification software employed in the embodiments of FIGS. 15 and 16 may be in any of the forms herein described.

Alternative Applications for the Invention

Generic Nature of Invention

Although, for ease of understanding, the verification apparatus and process in accordance with the invention has been described by way of the specific relatively simple example of testing a cell phone, the invention is applicable, and easily adaptable, to the testing of a wide variety of different electronic devices and systems.

As will have been understood from consideration of the above detailed example of the invention as applied to testing of the software modules of the cell phone, the verification software and process according to the embodiment of invention described above comprises a set of "state" modules corresponding to the functional modules of the software to be tested i.e. there is a state module corresponding to each state in the state space of the software under test. In its generic form, therefore, the invention comprises a set of non-specific state modules, or a single such state module from which others can be derived, which are made specific to a particular application by providing in those modules instructions, such as illustrated in FIG. 6, which determine the possible next states in the state space. In addition, the generic form of the invention includes the control module for selecting sequences through the state space in a deterministic pseudorandom manner as described, and the constraint, coverage and error logging modules in generic form from which they can be adapted to specific applications.

Expressed alternatively, in a generic form, an embodiment of the invention may comprise a means for generating a plurality of state modules which can be populated with instructions for state selection in accordance with the state space of the system to be tested, and a means to select said state modules on the basis of one or more repeatable sequences of numbers, for example deterministic pseudorandom sequences of numbers, so as to cause a state space represented by the state modules to be transitioned in a plurality of different sequences.

Hence, adaptation of the verification software described for any application can easily be achieved by defining the state space for the application, creating a corresponding set of state modules such as described and illustrated in FIGS. 4 and 6, specifying any appropriate constraints in the constraint store 122 and adapting the coverage module and error logging module as appropriate.

The invention extends to a carrier carrying, and to a computer having stored therein, computer executable instructions which constitute such generic forms of the invention by means of which the verification software can be adapted to the state diagram of a device or system to be tested. The carrier may take any of the forms referred to in connection with FIG. 3.

Two examples of alternative applications will be briefly described below.

Throttle Control

Figure 17:
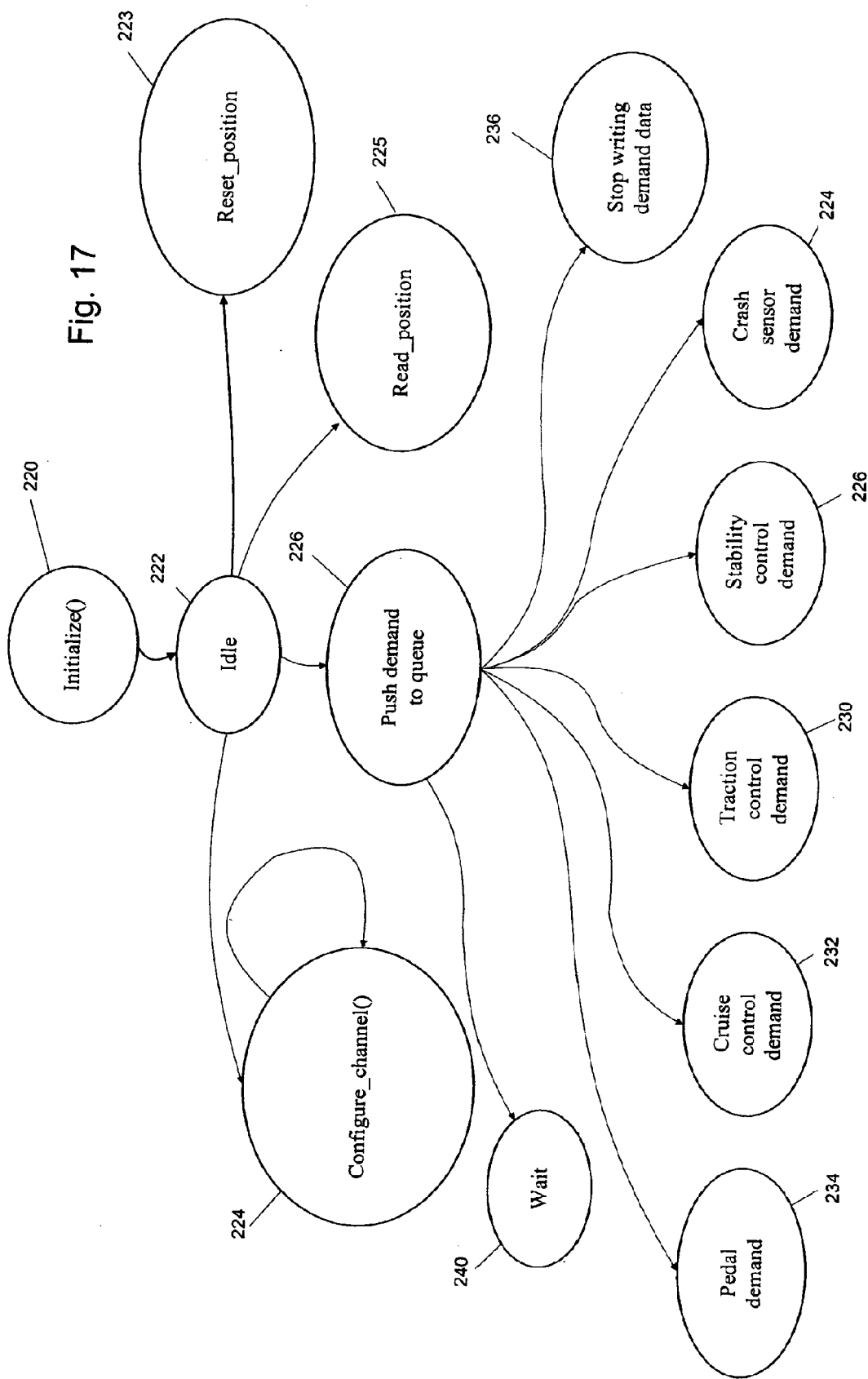
FIG. 17 is a state diagram of a system for a throttle control that may be verified according to the invention.

FIG. 17 is a state diagram showing schematically the operation of an alternative form of software which may be verified by means of the apparatus according to the invention, in this case a system which may be employed for the control of the throttle of an automobile engine. The software takes throttle demand inputs from a number of systems on the vehicle and makes decisions on the throttle actuation to be applied to the engine. The throttle actuation software will receive inputs from the following on-board systems: the accelerator pedal, the cruise control system, the traction control system, the stability control system and the crash sensors. Each system may asynchronously demand an increase, decrease or an absolute throttle value.

At the start of the state sequence, at state 220, the software is initialised by the command initialise( ), that is to say any shared memory and default parameters etc. are configured. The system is configured based on which other systems are installed in the vehicle, and the appropriate data channels are enabled or disabled and configured. Channel configuration data may include parameterisable items such as the maximum allowable magnitude of the throttle demand, the maximum change or rate of change in the demand, and the expected data frequency etc. The throttle software will implement checks to ensure that the received data obeys the constraints and/or configuration for a given channel, and to ensure that the received data is not out of date. The throttle software implements a priority algorithm to ensure that appropriate throttle actuation is achieved based on the demands.

For example, the throttle software may operate on the following priority of operation algorithm:
1) Crash sensors have ultimate priority to cut off fuel supply (minimise throttle actuation).
2) Stability and traction control have priority to modify throttle demand in order to maintain vehicle stability.
3) Finally, the driver pedal demands are able to "push through" additional throttle demand above that required by the cruise control.

The throttle control application program interface (API) in this example has the following functions:
a) initialise( ): perform general one-time initialisation actions;
b) configure_channel( ): enable and configure a data channel;
c) reset_position( ): reset the throttle position to a known initial position;
d) read_position( ): returns the current position calculated for the throttle actuator.

In addition to the function API, demand messages are written directly into the shared memory, and the software will periodically read and interpret the messages accordingly.

In order to verify this software in accordance with the invention, verification software which is similar to that described with reference to FIGS. 4 and 6 is constructed but with the state modules corresponding to the states shown in FIG. 15 instead of the states of FIG. 5. Also, any appropriate constraints will be stored in the constraint store 122, appropriate weightings and action commands provided, and the coverage module and error logging module also appropriately adapted.

The steps to verify the software whose state diagram is shown in FIG. 17 can be understood as follows, by reference to FIG. 17. The following operations are conducted in the verification process:
1) the initialise( ) function 220 is called in order to initialise the software.
2) Once initialisation is complete the Idle sequence 222 is called. In the Idle sequence, the sequence to "Push demands to the queue" is disabled until at least one channel has been configured.
3) The Idle sequence is exhaustive so that it will continually call the child sequences or next states until none remain to be called. The sequences following Idle are called randomly with probability according to their relative weights. For example, the "Reset_position( )" and "Configure_channel( )" sequences 223 and 224 may have a weighting of 1, while the "Read_position" sequence 225 may have a weighting of 5 and the "Push demand to queue" sequence 226 may have a weighting of 20. As each sequence completes it will return to Idle and the Idle state will then call one of the child sequences or next states.
4) Whenever a configure_channel sequence is called, an un-configured channel is selected and parameters for the channel are pseudo-randomly generated using the random number generator and according to defined constraints or constraints, and that channel is enabled or disabled.
5) Once at least one channel has been enabled the "Push demand to queue" sequence 226 may be selected. This is an exhaustive sequence where following sequences representing each of the possible message types are generated and sent to the shared data memory representing demands from the respective system. Again, the child sequences or next states are called pseudo-randomly with a probability determined by their weighting. For example the "Crash sensor demand" sequence 224, and "Stability control demand" sequence 226, may typically have a weighting of 1, while the "Traction control demand" and "Cruise control demand" sequences 230 and 232 may have a weighting of 5, and the "Pedal demand" sequence 234 may have a weighting of 10. In this sequence, each type of message has a call limit which when expired prohibits any further calls to that data type. If the "stop writing demand data" sequence 236 is called, no more data is written, and all counters are reset for the following message sequences and the sequence is returned to the Idle state 222. If the "wait" sequence 240 is called a random wait period determined by pseudo-random number generator occurs before the sequence continues.

Graphics Processor

Figure 18:
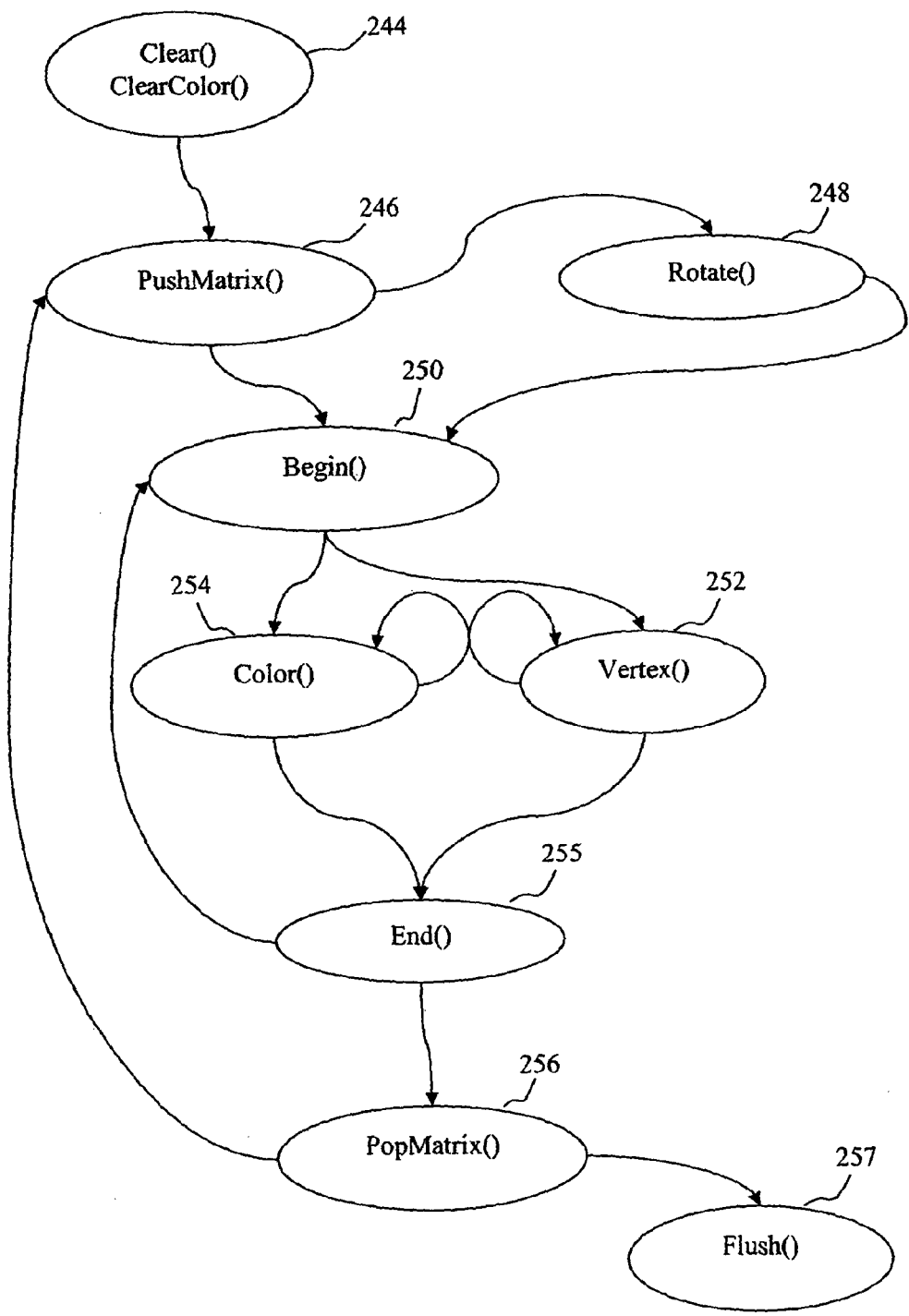
FIG. 18 is a state diagram of a graphics processor that may be verified according to the invention.

FIG. 18 is a schematic flow diagram of another system that may be verified by the present invention. This embodiment relates to Open GL software for graphics generation which is an industry standard API for describing 3D graphical objects for display on a computer screen or mobile device, for example a smart phone or tablet. This API is most commonly used in computer gaming applications but also has wider application. The Open GL program is defined by calls to the API functions and is most commonly executed in a Graphics Processing Unit which is specialised hardware contained in graphics cards and most smart portable devices.

A complete 3D graphics "scene" is created by defining a number of objects, each object being made up of a number of simple shapes for example triangles, squares or the like. Each object may be coloured or shaded.

The purpose of the Open GL program generator is to generate a random scene that is made up of a random number of objects. Each object will consist of a random number of simple elements with random vertices, each coloured randomly.

FIG. 18 shows schematically the operation of the sequence.
1) The sequence starts by clearing the scene and the colour map using the commands Clear( ) and ClearColour( ) 244.
2) Next the PushMatrix( ) command 246 is called creating a new object on the processor stack.
3) At this point the sequence may randomly cause the object to be rotated within the scene using the Rotate( ) command 248 or it may go straight to beginning the definition of the object.
   a) If Rotate is called, a random vector will be generated to rotate the object about a point along with a random angle of rotation, and these parameters are passed to the Rotate( ) API function.
   b) If Begin( ) is selected 250 either after PushMatrix( ) 246 or after Rotate( ) 248 an object type will be selected. For example a triangle, triangle strip, quad, quad strip, lines etc may be selected. The vectors generated by this operation will be applied to this object.

4) After Begin( ) 250, the sequence will begin to build the random object. This is done by (pseudo)randomly generating 3D vertices 252 and colours 254.
5) At any time during object creation the End( ) API function 255 may be called ending the current drawing type ending the current drawing type and a new drawing may be created by returning to Begin 250 or the whole object may be ended by calling PopMatrix( ) 256.
6) After popping the object more objects may be created or the scene may be flushed by the flush command 257 so that it is displayed.

Again, order to verify this software in accordance with the invention, verification software which is similar to that described with reference to FIGS. 4 and 6 is constructed but with the state modules corresponding to the states shown in FIG. 18 instead of the states of FIG. 5. Also, any appropriate constraints will be stored in the constraint store 122, appropriate weightings and action commands provided, and the coverage module and error logging module also appropriately adapted. The verification software is then run in a manner analogous to that described with reference to FIGS. 4 to 10.

Accordingly, from the above description it can be appreciated that in order to set up the verification apparatus for testing any particular system, a set of state modules having, preferably, a structure similar to those illustrated in FIG. 6 may first be created, possibly with the assistance of a state diagram of the system to be tested such as that shown in FIG. 6. These may be with or without weightings and the system may be with or without constraints according to requirements of the system under test. The system may or may not require the monitoring of sequences dependent upon the requirements of the system under test, and accordingly the invention may be modified in this respect as needed.

Further Modifications and Alternatives

Enabling and Disabling States

As explained above in the description of FIG. 7, constraints may be stored in the constraint store 122 to prevent certain state modules from being activated in certain circumstances, and it is possible for the constraints to change dynamically in response to predefined conditions that may arise as the system is operated. In effect, therefore, such constraints dynamically enable and disable states.

A number of different methods of enabling and disabling states are possible. For example, referring to the structure of the state modules as described with reference to FIG. 6, functionality could be included in the verification software so that, under certain predetermined conditions, in the or each state module which immediately precedes a state module to be disabled:
(a) the weighting in the appropriate field 116 is set to 0, or
(b) the instruction 117 for selecting the state to be disabled is removed, or
(c) the instruction 117 for selecting the state to be disabled is prevented from being selected by further constraining the constrained number stored in the relevant constrained number store 131, 133, 135 etc such that it cannot have a value corresponding to the relevant instruction 117.

The functionality of the system could be such that when the predetermined conditions no longer exist, the state which has been disabled is re-enabled by restoring the relevant weighting factor, restoring the relevant instruction or removing the relevant constraint on the value of the constrained number in the relevant constrained number store.

Other means for dynamically disabling and enabling one or more selected state modules are possible.

As may be appreciated, disabling and enabling state modules dynamically amounts to dynamically changing or modifying the state diagram or state space of the verification software, which as will be apparent from the foregoing description, mirrors the state diagram of the apparatus or system under test.

Modifications to FIGS. 8, 12 and 14

Further, there are a number of other possibilities for different forms of number generator or modifications of the number generators so far described. For example:
(i) In FIG. 8, the number stores 130, 132, 134 etc may be initially populated with values from a pseudorandom sequence generated using a first function, and the sequences generated from these values may be generated using different functions, for example a respective different, unique function for each state.
(ii) In FIG. 8, the same function as for subsidiary seed generation may be used for subsidiary sequence generation but different values for the constants (for example of a linear, congruential generator) may be used for each subsidiary sequence.
(iii) In FIG. 8, a first function (such as a linear congruential generator) may be used to generate the subsidiary seeds and the subsidiary sequences may all be generated from the subsidiary seeds using a second function (such as the function described with reference to FIG. 13) which is different from the first function. As each subsidiary seed is different, the sequence generated therefrom will be different even if the same function is used for generating all of the subsidiary sequences.
(iv) In FIG. 8, the subsidiary seeds may comprise selected, spaced apart numbers from a simple pseudorandom sequence derived by subjecting the main seed 126 to a particular function. For example, the subsidiary seeds may comprise every $1000^{th}$ number of the simple pseudorandom sequence. The same function may be used to generate, from the subsidiary seeds, the subsidiary sequences for all of the states. Thus, in this example, each state may then have up to 999 numbers in its sequence without overlapping with the sequence of any other state. In other words, different ranges of the same pseudorandom sequence may be used for different states.
(v) In the number generator of FIG. 12, different ones of the state and/or parameter sequence generators may use respective different algorithms in the calculation modules for the generation of the respective different sequences.
(vi) In the number generator of FIG. 12, the calculation module of FIG. 13 may be used to populate the state seed stores but a different, simple pseudorandom number generator may be used for generating the state sequences, the same generator being used for each state. The sequences for each state will be different because they each start from a different seed.
(vii) In the number generator of FIG. 12, a simple pseudorandom number generator may be used to populate the seed stores, but the calculation module of FIG. 13 may be used to generate the state sequences. The sequences for the states will be different because they each start from a different seed.
(viii) Various modifications may be made to the calculation module of FIG. 13, for example:
(a) Instead of concatenating, respectively, the most significant half of S1 and S2, other parts of S1 and S2 may be concatenated. For example, the middle portions such as the second and third quarter of S1 may be concatenated with the second and third quarter of S2. It will be clear that many similar alternatives are possible.

(b) Instead of using only two values S1 and S2 and concatenating portions of S1 and S2 to generate the pseudorandom sequence, a greater number of values may be used for this purpose. For example, four values S1, S2, S3 and S4 may be used and the upper quarters of the values (or some other portions) may be concatenated to obtain the pseudorandom sequence.

(c) Instead of generating the first number of the pseudorandom sequence from the main seed S by concatenating, respectively, the most significant halves of S and 1-S, the first number of the pseudorandom sequence may be generated by concatenating two randomly chosen different main seeds.

(d) Instead of deriving the pseudorandom sequence from a concatenation of two values (S1 and S2), the pseudorandom sequence may be generated by subjecting a single number to different functions and then concatenating.

Although it will be appreciated from the above that the generator for the pseudorandom sequences may take a number of different forms, preferred embodiments are such that:

(i) A single value seeds the entire number generator.
(ii) The sequences for the different states are not obviously similar (for example, the same but shifted by a single or low number of places)
(iii) It is possible to set the value of one or more of the state seeds manually, and to retain the or each such value constant throughout one or more tests Further General Modifications and Alternatives Although the embodiments of the invention have been described as being, at least mainly, software implemented, including the state modules, if an embodiment is to be created for testing only one specific kind of device, for example a cell phone, at least some parts of the system may be implemented in hardware. For example, the state modules which are illustrated in FIG. 6 as blocks of computer instructions or code could, particularly if intended only for testing a specific device such as a cell phone, be implemented in hardware employing Boolean logic.

However, in its preferred form, the invention is implemented by means of code constituting computer executable instructions. Object oriented code may be employed in which, for example, each of the state modules is constituted by an object.

Further, it should be understood that although, for ease of understanding, the embodiments of the invention as shown in FIGS. 4, 6, 7, 8, 12 and 13 have be illustrated and described in terms of a number of different modules, this arrangement of modules is not a limitation on the scope of the invention. For example, whilst the state modules illustrated in FIG. 6 have been described as containing just a block of instructions and weightings, it would be possible for the state sequence generators illustrated in FIG. 12 to form part of the state modules (or be within a data object constituting a state module) instead of being considered as separate modules.

Many other variations in the architecture of the software, and the arrangement of the software components, are possible. For example, although FIG. 12 illustrates an embodiment in which there is a separate sequence generator for the generation of each of the sequences of numbers, it would be possible for some or all of the state modules to share a single sequence generator which generates the respective sequences for those states as required. In one specific alternative form of the invention, each state module may include its own seed store for storing seeds in the manner described with reference to FIG. 12, but there may be only a single calculation module shared by all of the states, or several shared calculation modules each shared by a number of states, for generating the respective sequences of numbers derived from the respective seeds.

Hence, the invention may be applied to the testing of the wide variety of systems and devices having embedded software or general-purpose computer systems programmed as graphics processors or other processors, such as word processors, operating systems etc. In all cases, employment of the invention for testing such systems prior to the manufacture and distribution thereof may result in substantially improved functionality and reliability of the final product, whether it be a device employing embedded software or a programmed general-purpose computer system or network.

A wide variety of different methods of generating numbers used for causing sequencing through states may be employed but preferably the generation of a "deterministic" series of "random" numbers is employed and this is preferably achieved by starting with a random seed number, applying a predetermined function to it to obtain the second number and then applying the same predetermined function to the second number to obtain the third number and so on.

Additional Statements of Aspects of the Invention

The following clauses define a number of further aspects of the invention:

1. A method of testing a program-controlled computer system operable in a plurality of states each of which is such that said system can transition therefrom to any one of a plurality of permitted succeeding said states so that said system can transition through said states in a multiplicity of different sequences, in which said method is performed utilising a testing apparatus which generates a deterministic pseudorandom sequence of control signals which cause said computer system to transition through said states in a plurality of deterministic pseudorandom sequences.

2. A method according to clause 1, in which said testing apparatus is operable to generate said pseudorandom sequences in a manner in which the sequences are repeatable.

3. A method according to clause 2, in which:
(a) said testing apparatus includes
  (i) a plurality of functional modules each corresponding to a respective one of said plurality of states and each operable for selecting any one of the functional modules corresponding to the permitted succeeding states, and
  (ii) at least one number generator operable for generating at least one deterministic pseudorandom sequence of numbers;
and
(b) said method comprises operating said testing apparatus:
  (i) to cause said at least one number generator to generate at least one deterministic pseudorandom sequence of numbers;
  (ii) to cause said functional modules to select a permitted succeeding functional module in dependence upon respective numbers in said deterministic sequence so that said functional modules are selected in sequences determined from said deterministic sequence of numbers;
  (iii) to generate, in response to selection of each said functional module, a said control signal to cause said system to transition to the state corresponding to the selected functional module so that said system transitions through said plurality of states in sequences corresponding to the sequences in which the functional modules are selected.

4. A method according to clause 3, in which said testing apparatus is operable for generating a plurality of different sequences of deterministic pseudorandom numbers, each said different sequence corresponding to a respective different functional module, each functional module being operative to utilise the corresponding sequence of deterministic pseudorandom numbers to select the next permitted functional module.

5. A method according to clause 4, in which said testing apparatus comprises a plurality of deterministic pseudorandom sequence generators each corresponding to a respective different one of said functional modules and being for generating the sequence of deterministic pseudorandom numbers corresponding to said respective functional module.

6. A method according to clause 5, in which each said sequence generator comprises a seed store and a calculation module for calculating the corresponding sequence of deterministic pseudorandom numbers utilising a seed stored in the seed store.

7. A method according to clause 6, in which at least one of said functional modules utilises at least one variable parameter in the selection of the next permitted functional module.

8. A method according to clause 7, in which said apparatus includes a parameter value generator corresponding to said at least one functional module, said parameter value generator being operable to generate the values of said variable parameters as a deterministic pseudorandom sequence.

9. A method according to clause 8, in which the or each parameter value generator comprises a parameter seed store and a calculation module for generating the values of said variable parameters in dependence upon a parameter seed stored in the parameter seed store.

10. A method according to clause 9, in which the parameter seed of the or each parameter value is constituted by a number from the pseudorandom sequence generated by the pseudorandom sequence generator of the corresponding functional module.

11. A method according to any of clauses 6 to 10, in which said apparatus includes a seed generator which generates a deterministic pseudorandom sequence of values which are inserted respectively into said seed stores of said sequence generators corresponding to said functional modules, thereby to constitute said seeds for said functional modules.

12. A method according to clause 11, in which said seed generator comprises a primary seed store and a calculation module which generates said sequence of values utilising a primary seed stored in the primary seed store, said functional module seeds thereby constituting secondary seeds derived from said primary seed.

13. A method according to any of clauses 6 to 12, wherein said calculation modules are the same as each other.

14. A method according to any of clauses 6 to 13, wherein each said calculation module comprises a linear congruential generator.

15. A method according to any of clauses 6 to 14, wherein a plurality of tests are performed, each test utilising different seed values.

16. A method according to any of clauses 6 to 14, in which at least a first and at least a second test are performed and in the second test selected ones of the seed values are maintained at the same value as in the first test so that the corresponding functional modules behave in the same way as in the first test, and the remainder of the seed values used in the second test differ from those used in the first test so that the corresponding functional modules behave differently in the second test.

17. A method according to any preceding clause, wherein at least one of said functional modules utilises one or more weight values so that the selection of the next permitted functional module is dependent upon said one or more weight values.

18. A method according to any preceding clause, wherein said apparatus stores one or more constraints for constraining one or more of said functional modules in relation to the selection of next permitted states.

19. A method according to any preceding clause, wherein the apparatus includes a coverage analysis module which stores data defining the operation of the testing apparatus in a test.

20. The method according to clause 19, wherein said coverage analysis module records the number of times each state has been called in a test.

21. The method according to clause 20, wherein the coverage analysis module is operable for indicating the difference between an operator entered target value for the calling of an operator determined state and the actual number of times the operator determined state was called in a test.

22. The method according to clause 19, 20 or 21, wherein the coverage analysis module includes a store for storing one or more operator defined sequences of states and a sequence monitor for monitoring for the occurrence of said operator defined sequences in a test, said coverage analysis module being operable to record the number of times each said operator defined sequence occurs in the test.

23. A method according to clause 22, wherein the coverage analysis module records the number of times each said operator defined sequence begins but does not complete because the system transitions to a permitted subsequent state not in accordance with the operator defined sequence.

24. A method according to clause 22 or 23, wherein the coverage analysis module records the number of times each said operator defined sequence begins but aborts before completion.

25. A method according to any of clauses 1 to 24, in which said testing apparatus is incorporated into a device which includes the computer system under test.

26. The method according to any of clauses 1 to 24, in which said testing apparatus is connected to the system under test by a communication link for supplying said control signals thereto.

27. A method according to any of clauses 1 to 24, in which said testing apparatus comprises a computer which stores a software simulation of the computer system to be tested and in which the test is performed on the software simulation.

28. A method of making a plurality of products each of which includes a program controlled computer system, comprising:
(a) testing a version, sample or prototype of said program controlled computer system in accordance with the method of any of clauses 1 to 27;
(b) modifying the design of said program controlled computer system, if necessary, in dependence upon the results of said testing in order to remove or alleviate faults; and
(c) manufacturing said plurality of products each with a program controlled computer system corresponding to the tested version, sample or prototype as tested in step (a) or, if necessary, as modified in step (b).

29. A method according to clause 28, in which the product is a device having embedded software.

30. A method of making a of computer program product comprising a carrier carrying computer executable instructions for controlling a computer system, comprising
(a) testing a version, sample or prototype of said computer executable instructions in accordance with the method of any of clauses 1 to 27;
(b) modifying said computer executable instructions, if necessary, in dependence upon the results of said testing in order to remove or alleviate faults; and
(c) providing on said carrier said computer executable instructions corresponding to the tested version, sample or prototype as tested in step (a) or, if necessary, as modified in step (b).

31. Apparatus for testing a program-controlled computer system operable in a plurality of states each of which is such that said system can transition therefrom to any one of a plurality of permitted succeeding said states so that said system can transition through said states in a multiplicity of different sequences, said apparatus being operable to generate a deterministic pseudorandom sequence of control signals which cause said computer system to transition through said states in a plurality of deterministic pseudorandom sequences.

32. Apparatus according to clause 31, which is operable to generate said pseudorandom sequences in a manner in which the sequences are repeatable.

33. Apparatus for testing a program-controlled computer system operable in a plurality of states each of which is such that said system can transition therefrom to any one of a plurality of permitted succeeding said states so that said system can transition through said states in a multiplicity of different sequences, comprising:
a plurality of functional modules each of which corresponds to a respective one of said plurality of states and is operable for selecting any one of the functional modules corresponding to the permitted succeeding states;
a number generator operable for generating a deterministic pseudorandom sequence of numbers;
means for controlling each functional module to select a permitted succeeding functional module in dependence upon respective numbers in said deterministic sequence to cause said functional modules to be selected in sequences determined from said deterministic sequence of numbers; and
means responsive to selection of each said functional module to generate a control signal for causing said system to transition to the state corresponding to the selected functional module, thereby to cause said system to transition through said plurality of states in sequences corresponding to the sequences in which the functional modules are selected.

34. Apparatus according to clause 33, in which said number generator is operable for generating a plurality of different sequences of deterministic pseudorandom numbers, each said different sequence corresponding to a respective different functional module, each functional module being operative to utilise the corresponding sequence of deterministic pseudorandom numbers to select the next permitted functional module.

35. Apparatus according to clause 34, in which said number generator includes a plurality of deterministic pseudorandom sequence generators each corresponding to a respective different one of said functional modules and being for generating the sequence of deterministic pseudorandom numbers corresponding to said respective functional module.

36. Apparatus according to clause 35, in which each said sequence generator comprises a seed store and a calculation module for calculating the corresponding sequence of deterministic pseudorandom numbers utilising a seed stored in the seed store.

37. Apparatus according to clause 36, in which at least one of said functional modules is operable to utilise at least one variable parameter in the selection of the next permitted functional module.

38. Apparatus according to clause 37, including a parameter value generator corresponding to said at least one functional module, said parameter value generator being operable to generate the values of said variable parameters as a deterministic pseudorandom sequence.

39. Apparatus according to clause 38, in which the or each parameter value generator comprises a parameter seed store and a calculation module for generating the values of said variable parameters in dependence upon a parameter seed stored in the parameter seed store.

40. Apparatus according to clause 39, in which the parameter seed of the or each parameter value is constituted by a number from the pseudorandom sequence generated by the pseudorandom sequence generator of the corresponding functional module.

41. Apparatus according to any of clauses 36 to 40, including a seed generator which generates a deterministic pseudorandom sequence of values which are inserted respectively into said seed stores of said sequence generators corresponding to said functional modules, thereby to constitute said seeds for said functional modules.

42. Apparatus according to clause 41, in which said seed generator comprises a primary seed store and a calculation module which generates said sequence of values utilising a primary seed stored in the primary seed store, said functional module seeds thereby constituting secondary seeds derived from said primary seed.

43. Apparatus according to clause 42, wherein the value of said primary seed is operator selectable.

44. Apparatus according to any of clauses 36 to 43, wherein said calculation modules are the same as each other.

45. Apparatus according to any of clauses 36 to 44, wherein each said calculation module comprises a linear congruential generator.

46. Apparatus according to any of clauses 36 to 44, having means for fixing the values of at least some of said seeds to at least first and at least second tests to be performed in which, in the second test, selected ones of the seed values are maintained at the same value as in the first test so that the corresponding functional modules behave in the same way as in the first test, and the remainder of the seed values used in the second test differ from those used in the first test so that the corresponding functional modules behave differently in the second test.

47. Apparatus according to any preceding clause, wherein at least one of said functional modules utilises one or more weight values so that the selection of the next permitted functional module is dependent upon said one or more weight values.

48. Apparatus according to any preceding clause, including a constraint store for storing one or more constraints for constraining one or more of said functional modules in relation to the selection of next permitted states.

49. Apparatus according to any preceding clause, wherein the apparatus includes a coverage analysis module which stores data defining the operation of the testing apparatus in a test.

50. Apparatus according to clause 49, wherein said coverage analysis module records the number of times each state has been called in a test.

51. Apparatus according to clause 50, wherein the coverage analysis module is operable for indicating the difference between an operator entered target value for the calling of an operator determined state and the actual number of times the operator determined state was called in a test.

52. Apparatus according to clause 49, 50 or 51, wherein the coverage analysis module includes a store for storing one or more operator defined sequences of states and a sequence monitor for monitoring for the occurrence of said operator defined sequences in a test, said coverage analysis module being operable to record the number of times each said operator defined sequence occurs in the test.

53. Apparatus according to clause 52, wherein the coverage analysis module is operable to record the number of times each said operator defined sequence begins but does not complete because the system transitions to a permitted subsequent state not in accordance with the operator defined sequence.

54. Apparatus according to clause 52 or 53, wherein the coverage analysis module is operable to record the number of times each said operator defined sequence begins but aborts before completion.

55. Apparatus according to any of clauses 30 to 54, which is incorporated into a device which includes the computer system to be tested test.

56. Apparatus according to any of clauses 30 to 54, which is connectable to a system to be tested by a communication link for supplying said control signals thereto.

57. Apparatus according to any of clauses 30 to 54, which comprises computer executable instructions stored in a computer capable of storing a software simulation of the computer system to be tested, said computer executable instructions being executable for performing tests on the software simulation.

58. Apparatus for testing a program-controlled computer system operable in a plurality of states each of which is such that said system can transition therefrom to any one of a plurality of permitted succeeding said states so that said system can transition through said states in a multiplicity of different sequences, comprising:
a seed generator comprising a first seed store and a first calculation module operable to generate, from a first seed stored in said first seed store, a first deterministic sequence of pseudorandom numbers forming a plurality of second seeds;
a plurality of state sequence generators each corresponding to a respective different one of said states and each comprising a respective second seed store, each arranged for receiving a respective one of said plurality of second seeds, and a respective second calculation module operable to generate, from the respective second seed, a respective second deterministic sequence of pseudorandom numbers;
a plurality of functional modules each of which corresponds to a respective one of said plurality of states and is operable for selecting any one of the functional modules corresponding to the permitted succeeding states;
means for controlling each functional module such that, each time it is selected, it selects a permitted succeeding functional module in dependence upon the value of the next number in said respective second deterministic sequence of pseudorandom numbers; and
means responsive to selection of each said functional module for causing said system to transition to the state corresponding to the selected functional module thereby to cause said system to transition through said plurality of states in sequences corresponding to the sequences in which the functional modules are selected.

59. Apparatus according to clause 58, wherein at least one of said functional modules is operable for selecting said next permitted functional module partly on the basis of a variable parameter value, and the associated state sequence generator includes a parameter sequence generator, said parameter sequence generator comprising:
(a) a parameter seed store which is arranged for receiving, as a parameter seed value, a number from the sequence generated by the corresponding second calculation module, and
(b) a third calculation module operable for generating a third deterministic sequence of pseudorandom numbers, which constitutes said variable parameter values.

60. Apparatus for testing a program-controlled computer system operable in a plurality of states each of which is such that said system can transition therefrom to any one of a plurality of permitted succeeding said states so that said system can transition through said states in a multiplicity of different sequences, said apparatus being operable to generate a repeatable pseudorandom sequence of control signals which cause said computer system to transition through said states in a plurality of repeatable pseudorandom sequences.

61. Apparatus for testing a program-controlled computer system operable in a plurality of states each of which is such that said system can transition therefrom to any one of a plurality of permitted succeeding said states so that said system can transition through said states in a multiplicity of different sequences, comprising:
a plurality of functional modules each of which corresponds to a respective one of said plurality of states and is operable for selecting any one of the functional modules corresponding to the permitted succeeding states;
one or more number generators operable for generating a plurality of sequences pseudorandom numbers, each sequence corresponding to a respective different functional module;
means for activating said functional modules to select a permitted succeeding functional module in dependence upon respective numbers in said corresponding sequences such that, each time a functional module is activated, said selection is dependent upon a different number in the corresponding sequence; and
means responsive to selection of each said functional module to generate a control signal or command for causing said system to transition to the state corresponding to the selected functional module, thereby to cause said system to transition through said plurality of states in sequences corresponding to the sequences in which the functional modules are selected.

62. Apparatus for testing a program-controlled computer system operable in a plurality of states each of which is such that said system can transition therefrom to any one of a plurality of permitted succeeding said states so that said system can transition through said states in a multiplicity of different sequences, comprising:
a plurality of functional modules each of which corresponds to a respective one of said plurality of states and is operable for selecting any one of the functional modules corresponding to the permitted succeeding states;
means for storing a plurality of different seeds each corresponding to a respective different one of said plurality of functional modules;
means for generating a respective different pseudorandom sequence of numbers from each respective seed thereby to provide a respective different pseudorandom sequence corresponding to each respective different functional module;
means for activating said functional modules to select a permitted succeeding functional module in dependence upon respective numbers in said corresponding sequences such that, each time a functional module is activated, said selection is dependent upon a different number in the corresponding sequence; and means responsive to selection of each said functional module to generate a control signal or command for causing said system to transition to the state corresponding to the selected functional module, thereby to cause said system to transition through said plurality of states in sequences corresponding to the sequences in which the functional modules are selected.

63. Apparatus according to clause 62, comprising means for populating said seed stores with respective seeds all of which are derived as a pseudorandom sequence from a common initial seed.

64. Apparatus for testing a program-controlled computer system operable in a plurality of states each of which is such that said system can transition therefrom to any one of a plurality of permitted succeeding said states so that said system can transition through said states in a multiplicity of different sequences, said apparatus being operable to generate sequences of control signals or commands which cause said computer system to transition through said states in a plurality of repeatable pseudorandom sequences, said apparatus being further operable to perform a plurality of test runs in which, in at least one of said test runs, the transitions through at least one part of the state space are the same as in a previous test run and the transitions through other parts of the state space are different from the transitions in the previous test run.

65. Apparatus for testing a program controlled computer system substantially as herein described with reference to any of FIGS. 3 to 18.

66. A method of testing a program-controlled computer system operable in a plurality of states each of which is such that said system can transition therefrom to any one of a plurality of permitted succeeding said states so that said system can transition through said states in a multiplicity of different sequences, in which said method is performed utilising a testing apparatus which generates a pseudorandom sequence of control signals or commands which cause said computer system to transition through said states in a plurality of repeatable pseudorandom sequences.

67. A method of testing a program-controlled computer system operable in a plurality of states each of which is such that said system can transition therefrom to any one of a plurality of permitted succeeding said states so that said system can transition through said states in a multiplicity of different sequences, in which:

(a) said method is performed utilising a testing apparatus which includes
  (i) a plurality of functional modules each corresponding to a respective one of said plurality of states and each activatable for selecting any one of the functional modules corresponding to the permitted succeeding states, and
  (ii) one or more number generators operable for generating a plurality of sequences of pseudorandom sequences numbers, there being a respective different said sequence associated with each respective different functional module;
and
(b) said method comprises operating said testing apparatus:
  (i) to activate said functional modules to select a permitted succeeding functional module in dependence upon the numbers in the associated sequence in such a way that, each time a said functional is activated, the next permitted succeeding functional module is selected in dependence upon a different number in the associated sequence;
  (ii) to generate, in response to selection of each said functional module, a said control signal or command to cause said system to transition to the state corresponding to the selected functional module so that said system transitions through said plurality of states in sequences corresponding to the sequences in which the functional modules are selected.

68. A method of testing a program-controlled computer system operable in a plurality of states each of which is such that said system can transition therefrom to any one of a plurality of permitted succeeding said states so that said system can transition through said states in a multiplicity of different sequences, in which:

(a) said method is performed utilising a testing apparatus which includes
  (i) a plurality of functional modules each corresponding to a respective one of said plurality of states each having a respective different seed store associated therewith and each activatable for selecting any one of the functional modules corresponding to the permitted succeeding states,
  (ii) means for generating a plurality of sequences of pseudorandom sequences numbers each from a respective different one of said seed stores;
and
(b) said method comprises operating said testing apparatus:
  (i) to activate said functional modules to select a permitted succeeding functional module in dependence upon the numbers in the associated sequence in such a way that, each time a said functional is activated, the next permitted succeeding functional module is selected in dependence upon a different number in the associated sequence;
  (ii) to generate, in response to selection of each said functional module, a said control signal or command to cause said system to transition to the state corresponding to the selected functional module so that said system transitions through said plurality of states in sequences corresponding to the sequences in which the functional modules are selected.

69. A method according to clause 68, which comprises populating said seed stores with a respective plurality of seeds all of which are derived from a common initial seed.

70. A method of testing a program-controlled computer system operable in a plurality of states each of which is such that said system can transition therefrom to any one of a plurality of permitted succeeding said states so that said system can transition through said states in a multiplicity of different sequences, in which said method is performed utilising a testing apparatus which generates sequences of control signals or commands which cause said computer system to transition through said states in a plurality of repeatable pseudorandom sequences, the method comprising performing a plurality of test runs in which, in at least one of said test runs, the transitions through at least one part of the state space are the same as in a previous test run and the transitions through other parts of the state space are different from the transitions in the previous test run.

71. A method of testing a program controlled computer system substantially as herein described with reference to any of FIGS. 3 to 18.

72. A method of making a plurality of products each of which includes a program controlled computer system, comprising:

(a) testing a version, sample, prototype or simulation of said program controlled computer system utilising the apparatus of any of clauses 30 to 65 or the method of any of clauses 66 to 71;

(b) modifying the design of said program controlled computer system, if necessary, in dependence upon the results of said testing in order to remove or alleviate faults; and (c) manufacturing said plurality of products each with a program controlled computer system corresponding to the tested version, sample or prototype as tested in step (a) or, if necessary, as modified in step (b).

73. A method according to clause 72, in which the product is a device having embedded software.

74. A method of making a of computer program product comprising a carrier carrying computer executable instructions for controlling a computer system, comprising (a) testing a version, sample, prototype or simulation of said computer executable instructions and/or said program controlled computer system utilising the apparatus of any of clauses 30 to 65 or the method of any of clauses 66 to 71;

(b) modifying said version, sample or prototype of said computer implementable instructions and/or said program controlled computer system, if necessary, in dependence upon the results of said testing in order to remove or alleviate faults to provide a modified version, sample or prototype; and (c) providing on said carrier said computer executable instructions corresponding to the tested version, sample or prototype as tested in step (a) or, if necessary, as modified in step (b).

75. A carrier carrying computer implementable instructions which, when loaded into a computer, are executable to cause the computer to perform the testing method of any of clauses 1 to 30 or 66 to 71.

76. A carrier carrying computer implementable instructions which, when loaded into a computer, are operable to program the computer so that the programmed computer forms testing apparatus according to any of clauses 31 to 65.

77. A carrier according to clause 76, wherein said computer implementable instructions comprise:

(a) first code structured to enable generation therefrom of a plurality of said functional modules adapted to the state diagram of a system to be tested;

(b) second code executable to constitute one or more number generators for generating the pseudorandom sequence or sequences of numbers;

(c) third code executable for controlling each functional module to select a permitted succeeding functional module in dependence upon respective numbers in said sequence to cause said functional modules to be selected in sequences determined from said sequence of numbers; and (d) fourth code executable in response to selection of each said functional module to generate a command for causing the system under test to transition to the state corresponding to the selected functional module, for thereby causing said system to transition through said plurality of states in sequences corresponding to the sequences in which the functional modules are selected.

The invention claimed is:

1. A method of testing a program-controlled computer system operable in a plurality of states, wherein each state of said system can transition from said state to any one of a plurality of permitted succeeding said states wherein said system can transition through said states in a multiplicity of different sequences, said method being performed by a testing apparatus which generates a deterministic pseudorandom sequence of control signals or commands which cause said computer system to transition through said states in a plurality of deterministic pseudorandom sequences, wherein:

(a) said testing apparatus comprises:

(i) a plurality of functional modules each corresponding to a respective one of said plurality of states and each operable for selecting any one of the functional modules corresponding to the permitted succeeding states, and (ii) a number generator for generating a plurality of sets of different deterministic sequences of pseudorandom numbers, each different sequence in a said set corresponding to a respective different functional module, each functional module being operative to utilize the corresponding sequence to select the next permitted functional module;

(b) said method comprising operating said testing apparatus wherein it performs the method steps of:

(i) causing said number generator to make available, for a test, a said set of different sequences, (ii) causing said functional modules to select permitted succeeding functional modules, each functional module performing each selection of a permitted succeeding functional module in dependence upon a respective number in the corresponding sequence of the set of sequences made available by the number generator, and (iii) generating, in response to selection of each said functional module, a control signal or command to cause said system to transition to the state corresponding to the selected functional module wherein said system transitions through said plurality of states in sequences corresponding to the sequences in which the functional modules are selected; and (c) said number generator enabling set of different deterministic sequences of pseudorandom numbers to be repeated, in order to repeat a test utilizing a particular said set.

2. The method of claim 1, wherein said number generator comprises a plurality of state seed stores each associated with a respective functional module and each associated with a respective different state, said number generator populating said state seed stores with respective state seeds, and to derive said respective different deterministic sequences from the state seeds in the respective state seed stores.

3. The method of claim 2, wherein number generator populates said state seed stores with state seeds of respective different values.

4. The method of claim 3, wherein said number generator comprises a main seed store and a calculator to derive from a main seed in said main seed store a deterministic pseudorandom sequence that constitutes said state seeds.

5. The method of claim 4, wherein each deterministic pseudorandom sequence is generated by a linear congruential generator.

6. The method of claim 4, wherein said respective different deterministic sequences are derived by subjecting the state seeds to the same operation as used to derive the state seeds from the main seed.

7. The method of claim 4, wherein a plurality of tests are performed, each test utilizing a different main seed value.

8. The method of claim 7, in which at least a first and at least a second test are performed and in the second test selected ones of the state seed values are maintained at the same value as in the first test so that the corresponding functional modules behave in the same way as in the first test, and the remainder of the seed values used in the second test differ from those used in the first test so that the functional modules corresponding to said remainder behave differently in the second test.

9. The method of claim 2, wherein at least one of said functional modules utilizes at least one variable parameter in the selection of the next permitted functional module, the value of said variable parameter being changed for each selection operation in dependence upon a deterministic pseudorandom sequence derived from the state seed of the corresponding functional module.

10. The method of claim 1, wherein at least one of said functional modules utilizes a variable parameter, wherein said number generator comprises:
   (a) a main seed store,
   (b) a plurality of state seed stores each associated with a respective functional module and each thereby associated with a respective state,
   (c) a respective parameter seed store associated with each functional module that utilizes a variable parameter, and
   (d) the calculator to:
      (i) derive from a main seed in said main seed store a deterministic pseudorandom sequence that constitutes said state seeds, said state seeds being stored in said respective state seed stores,
      (ii) derive from said state seeds said respective different deterministic sequences of pseudorandom numbers that correspond respectively to said different functional modules,
      (iii) derive, in respect of each said functional module that utilizes a variable parameter, a parameter seed, said parameter seed being derived from the state seed of the respective functional module and stored in the respective parameter seed store, and
      (iv) derive from each parameter seed a respective further deterministic sequence of pseudorandom numbers, wherein each functional module that utilizes a variable parameter performs a selection of a permitted succeeding functional module in dependence both upon respective numbers in the sequence derived from the corresponding state seed and the sequence derived from the corresponding parameter seed.

11. The method of claim 10, wherein the pseudorandom sequence that constitutes the state seeds is generated by a seed generation process which comprises deriving intermediate seeds from said main seed and processing said intermediate seeds to derive therefrom the pseudorandom sequence that constitutes the state seeds.

12. The method of claim 11, wherein said processing of said intermediate seeds comprises subjecting each of said intermediate seeds to a pseudo-random sequence generating function to derive intermediate deterministic pseudo-random seed sequences and combining values from respective said intermediate seed sequences to obtain the state seeds.

13. The method of claim 12, wherein each of the intermediate seed sequences is derived by subjecting the respective intermediate seed to processing by a linear congruential generator.

14. The method of claim 12, which utilizes two intermediate seeds, said processing of said two intermediate seeds producing two intermediate seed sequences derived respectively from said two intermediate seeds.

15. The method of claim 14, wherein one of said two intermediate seeds is a function of the other of said two intermediate seeds.

16. The method of claim 15, wherein, when the value of the main seed is S, one of the intermediate seeds has a value S and the other has a value 1-S.

17. The method of claim 16, wherein each respective state seed is derived by concatenating the most significant bits of a respective seed in one of the intermediate seed sequences with the most significant bits of a respective seed in the other of the intermediate seed sequences.

18. The method of claim 1, wherein at least one of said functional modules utilizes a plurality of variable parameters, and wherein said number generator comprises:
   (a) a main seed store,
   (b) a plurality of state seed stores each associated with a respective functional module and each associated with a respective state,
   (c) a plurality of parameter seed stores associated with each functional module that utilizes a plurality of variable parameters, each parameter seed store being associated with a respective different one of the variable parameters utilized by the corresponding functional module, and
   (d) said calculator to:
      (i) derive from a main seed in said main seed store a deterministic pseudorandom sequence that constitutes said state seeds, said state seeds being stored in said respective state seed stores,
      (ii) derive from said state seeds said respective different deterministic sequences of pseudorandom numbers that correspond respectively to said different functional modules,
      (iii) derive, in respect of each said functional module that utilizes a plurality of variable parameters, a corresponding plurality of parameter seeds, said plurality of parameter seeds being derived from the corresponding state seed, having values that constitute a deterministic pseudorandom sequence, and being stored in the respective parameter seed stores, and
      (iv) derive from each parameter seed a respective further deterministic sequence of pseudorandom numbers, wherein each functional module that utilizes a plurality of variable parameters performs selection of a permitted succeeding functional module in dependence both upon respective numbers in the sequence derived from the corresponding state seed and the sequences derived from the corresponding parameter seeds.

19. A method of testing a program-controlled computer system operable in a plurality of states, in each state said system can transition from said state therefrom to any one of a plurality of permitted succeeding said states so that said system can transition through said states in a multiplicity of different sequences, said method being performed by a testing apparatus which generates a deterministic pseudorandom sequence of control signals or commands which cause said computer system to transition through said states in a plurality of deterministic pseudorandom sequences, wherein:
   (a) said testing apparatus comprises:
      (i) a plurality of functional modules each corresponding to a respective one of said plurality of states and each operable for selecting any one of the functional modules corresponding to the permitted succeeding states, and (ii) a number generator for generating a plurality of sets of numbers, each set comprising at least one deterministic sequence of pseudorandom numbers;

(b) said method comprising performing a test by operating said testing apparatus wherein it performs the method steps of:

(i) causing said number generator to make available, for said test, a said set of numbers, (ii) causing said functional modules to select permitted succeeding functional modules, each functional module performing each selection of a permitted succeeding functional module in dependence upon the value of a respective number in the set of numbers made available by the number generator, the values of said numbers utilized by each functional module differing from the values of the numbers utilized by each other functional module, and (iii) generating, in response to selection of each functional module, a control signal or command to cause said system to transition to the state corresponding to the selected functional module wherein said system transitions through said plurality of states in sequences corresponding to the sequences in which the functional modules are selected; and (c) said number generator to enable a set of numbers to be repeated in order to repeat a test utilizing a particular said set.

20. An apparatus for testing a program-controlled computer system operable in a plurality of states, in each state said system can transition from said state to any one of a plurality of permitted succeeding said states wherein said system can transition through said states in a multiplicity of different sequences, wherein, said testing apparatus comprises:

(a) a plurality of functional modules each of which corresponds to a respective one of said plurality of states and is operable for selecting any one of the functional modules corresponding to the permitted succeeding states;

(b) a number generator for generating a plurality of sets of numbers, each set comprising at least one deterministic sequence of pseudorandom numbers, each set being for a respective different test and said number generator being operable wherein a said set may be repeated wherein the corresponding test may be repeated;

(c) a controller for activating said functional modules to select a permitted succeeding functional module in dependence upon the values of respective numbers in said set wherein, each time a functional module is activated, said selection is dependent upon a different said number and the values of said numbers utilized by each functional module differ from the values of the numbers utilized by each other functional module; and (d) a command generator responsive to selection of each functional module to generate a command for causing said system to transition to the state corresponding to the selected functional module, thereby to cause said system to transition through said plurality of states in sequences corresponding to the sequences in which the functional modules are selected.

* * * * *